United States Patent
Oberhauser et al.

(10) Patent No.: US 12,088,568 B2
(45) Date of Patent: Sep. 10, 2024

(54) SYSTEMS AND METHODS FOR SECURE KEY SERVICE

(71) Applicant: Cambridge Blockchain, Inc., Cambridge, MA (US)

(72) Inventors: Alex Oberhauser, Medford, MA (US); Andrew John Trainor, Cambridge, MA (US)

(73) Assignee: Blockchains, Inc., Sparks, NV (US)

( * ) Notice: Subject to any disclaimer, the term of this patent is extended or adjusted under 35 U.S.C. 154(b) by 696 days.

(21) Appl. No.: 17/262,474

(22) PCT Filed: Jul. 23, 2019

(86) PCT No.: PCT/US2019/042951
§ 371 (c)(1),
(2) Date: Jan. 22, 2021

(87) PCT Pub. No.: WO2020/023460
PCT Pub. Date: Jan. 30, 2020

(65) Prior Publication Data
US 2021/0218720 A1    Jul. 15, 2021

Related U.S. Application Data

(60) Provisional application No. 62/702,288, filed on Jul. 23, 2018.

(51) Int. Cl.
| | | |
|---|---|---|
| *G06F 21/00* | (2013.01) | |
| *G06F 16/27* | (2019.01) | |
| *H04L 9/32* | (2006.01) | |
| *H04L 9/40* | (2022.01) | |
| *H04L 29/06* | (2006.01) | |
| *H04L 9/00* | (2022.01) | |

(52) U.S. Cl.
CPC .......... *H04L 63/0442* (2013.01); *G06F 16/27* (2019.01); *H04L 9/3239* (2013.01); *H04L 9/50* (2022.05)

(58) Field of Classification Search
CPC ........ G06F 16/27; H04L 9/50; H04L 63/0442
See application file for complete search history.

(56) References Cited

U.S. PATENT DOCUMENTS 10,116,633 B2    10/2018 Adams
10,248,783 B2    4/2019  Costa Faidella et al.
(Continued)

OTHER PUBLICATIONS

Zachary Diebold, "Self-Sovereign Identity using Smart Contracts on the Ethereum Blockchain", May 2017, University of Dublin, Trinity College, pp. 1-51 (Year: 2017).*
(Continued)

*Primary Examiner* — Rodman Alexander Mahmoudi
(74) *Attorney, Agent, or Firm* — PIERCE ATWOOD LLP

(57) ABSTRACT

Systems and methods for providing a secure custodial service for managing a digital asset. The method comprises receiving a first value for use in decrypting at least one attribute value, receiving the at least one attribute value in encrypted form, and storing, on at least one storage device, the first value and the at least one attributed value in encrypted form, wherein at least one attribute value has been encrypted using a second value and a public key associated with secure hardware, and the second value corresponds to the first value.

19 Claims, 11 Drawing Sheets

(56) References Cited

U.S. PATENT DOCUMENTS

| | | | |
|---|---|---|---|
| 10,817,967 | B2 | 10/2020 | Chabanne et al. |
| 2016/0275461 | A1 | 9/2016 | Sprague et al. |
| 2017/0078087 | A1 | 3/2017 | Chalker |
| 2017/0111175 | A1* | 4/2017 | Oberhauser ........ G11B 20/00086 |
| 2017/0177855 | A1 | 6/2017 | Costa Faidella et al. |
| 2018/0191714 | A1 | 7/2018 | Jentzsch et al. |
| 2019/0012637 | A1* | 1/2019 | Gillen .................. H04L 9/0819 |
| 2019/0164151 | A1* | 5/2019 | Doney ...................... H04L 9/50 |
| 2019/0340607 | A1* | 11/2019 | Lynn .................. G06Q 20/3678 |

OTHER PUBLICATIONS

International Search Report and Written Opinion mailed Nov. 27, 2019 in connection with International Application No. PCT/US2019/042951.

International Preliminary Report on Patentability mailed Feb. 4, 2021 in connection with International Application No. PCT/US2019/042951.

Invitation to Pay Additional Fees mailed Sep. 23, 2019 in connection with International Application No. PCT/US2019/042951.

[No Author Listed], DIF Identity Hubs. 10 pages. https://github.com/decentralized-identity/identity-hub/blob/master/explainer.md [last retrieved Dec. 21, 2018].

[No Author Listed], Identity Blockchain Proof of Concept. Jun. 3, 2016. 3 pages. https://sbo.tech/blog/tech-blog-1/post/identity-blockchain-proof-of-concept-3 [last retrieved Oct. 23, 2018].

[No Author Listed], Identity.com Verifiable Credential Library. 12 pages. https://github.com/identity-com/credential-commons/blob/master/README.md [last retrieved Dec. 21, 2018].

[No Author Listed], One Small Step for the Web . . . Oct. 23, 2018. 21 pages. https://www.inrupt.com/blog/one-small-step-for-the-web [last retrieved Oct. 25, 2018].

Andrieu et al., Verifiable Claims Use Cases. W3C Working Group Note. Jun. 8, 2017. 17 pages. https://www.w3.org/TR/verifiable-claims-use-cases [last retrieved Dec. 21, 2018].

Berners-Lee et al., Semantic Web Tutorial Using N3. May 20, 2003. 35 pages.

Bitansky et al., From Extractable Collision Resistance to Succinct Non-Interactive Arguments of Knowledge, and Back Again. Nov. 30, 2011. 51 pages.

Demos et al., Banks Have a Solution for Their Identity—Fraud Woes: The DMV. The Wall Street Journal. Nov. 12, 2018. 3 pages. https://www.wsj.com/articles/banks-have-a-solution-for-their-identity-fraud-woes-the-dmv-1542018600?mod=hp_lead_pos7 [last retrieved Nov. 12, 2018].

Duffy, The Top Blockchain Patents of 2018. Law360. Jan. 7, 2019. 4 pages. https://www.law360.com/articles/1115575/print?section=ip [last retrieved Jan. 15, 2019].

Longley et al., Linked Data Proofs 1.0. Draft Community Group Report. Nov. 1, 2018. 14 pages. https://w3c-dvcg.github.io/ld-proofs [last retrieved Feb. 17, 2019].

Oberhauser, A Distributed Computation Engine for Reproducible, Verifiable, Reusable and Transparent Computations. Thesis submitted in partial fulfillment for the degree of Master of Science. Vrije Universiteit Amsterdam. Jan. 2016. 63 pages.

Sporny et al., Verifiable Claims Data Model and Representations. W3C First Public Working Draft. Aug. 3, 2017. 34 pages. http://www.w3.org/TR/verifiable-claims-data-model [last retrieved Dec. 21, 2018].

Sporny et al., Verifiable Credentials Data Model 1.0. Expressing verifiable information on the Web. W3C Editor's Draft. Jan. 22, 2019. 83 pages. https://w3c.github.io/vc-data-model [last retrieved Jan. 22, 2019].

Zachary Diebold: "Self-Sovereign Identity using Smart Contracts on the Ethereum Blockchain" Master in Computer Science, May 1, 2017 (May 1, 2017), pp. 1-76, XP055628301, Retrieved from the Internet: URL:https://scss.tcd.ie/publications/these s/diss/2017/TCD-SCSS-DISSERTATION-2017-016.pdf.

\* cited by examiner

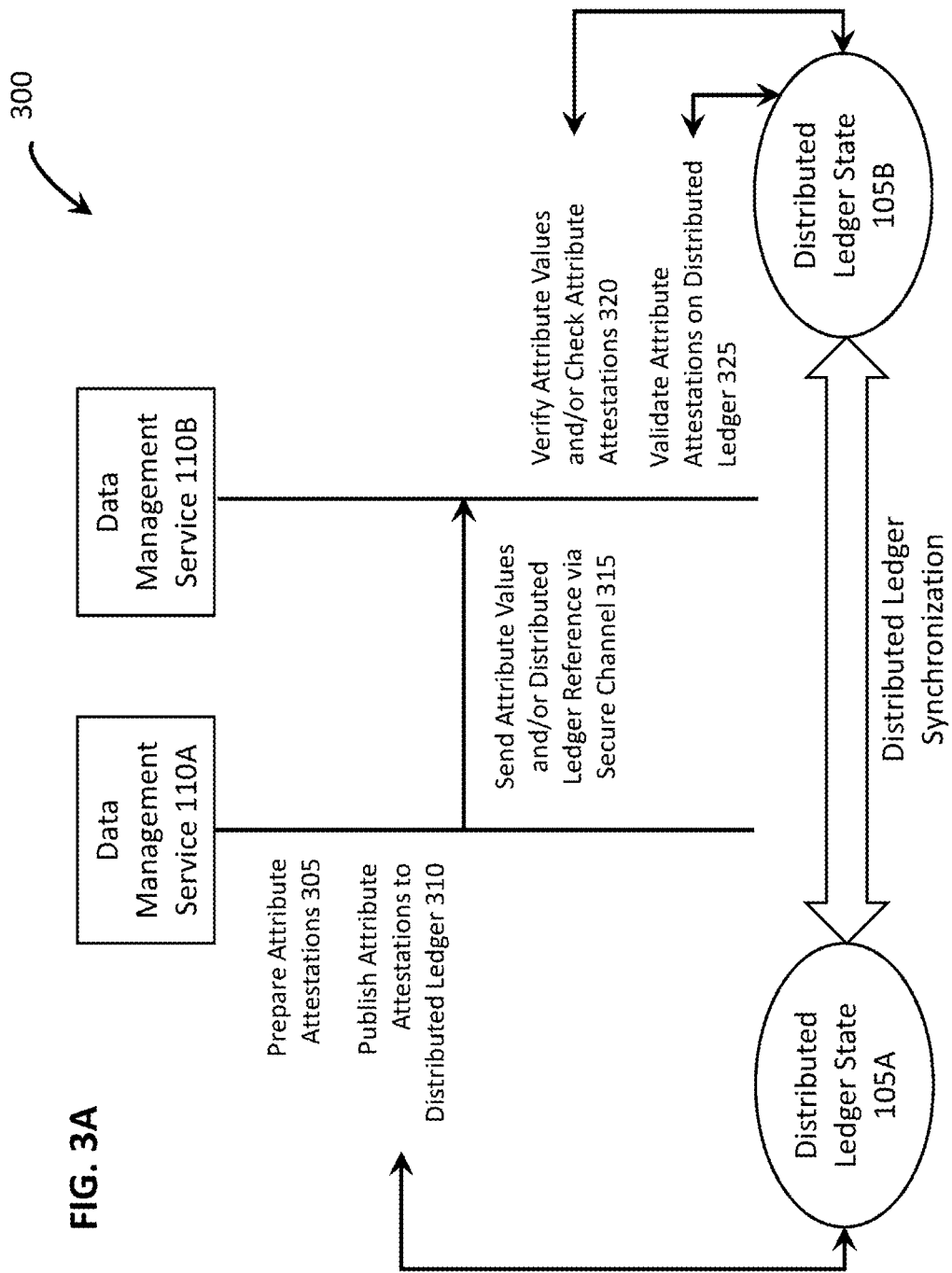

SYSTEMS AND METHODS FOR SECURE KEY SERVICE

RELATED APPLICATIONS

This application is a national stage filing under 35 U.S.C. § 371 of International Patent Application Serial No. PCT/US2019/042951, filed Jul. 23, 2019, entitled "SYSTEMS AND METHODS FOR SECURE CUSTODIAL SERVICE", which claims priority benefit under 35 U.S.C. § 119(e) to U.S. Provisional Application Ser. No. 62/702,288, filed on Jul. 23, 2018, entitled "SYSTEMS AND METHODS FOR CUSTODIAL KEY SERVICE," which is hereby incorporated by reference in its entirety.

This application may include subject matter related to that of U.S. patent application Ser. No. 15/294,643, filed on Oct. 14, 2016, entitled "SYSTEMS AND METHODS FOR MANAGING DIGITAL IDENTITIES," published on Apr. 20, 2017 as U.S. Patent Application Publication No. 2017/0111175 A1, issued on May 30, 2017 as U.S. Pat. No. 9,667,427, which is hereby incorporated by reference in its entirety, and is referred to herein as the '643 application.

This application may also include subject matter related to that of U.S. patent application Ser. No. 15/950,732, filed on Apr. 11, 2018, entitled "SYSTEMS AND METHODS FOR MANAGING DIGITAL IDENTITIES," published on Aug. 16, 2018 as U.S. Patent Application Publication No. 2018/0234433 A1, which is hereby incorporated by reference in its entirety, and is referred to herein as the '732 application.

BACKGROUND

Various cryptosystems may be used to provide information security. For instance, encryption techniques based on symmetric cryptosystems and asymmetric cryptosystems may be used to provide confidentiality, while signature techniques based on asymmetric cryptosystems, as well as hashing techniques, may be used to provide integrity.

SUMMARY

In some embodiments, a system is provided. The system comprises at least one computer processor, at least one storage device, and at least one computer-readable medium having encoded thereon instructions which, when executed, cause the at least one computer processor to perform a method. The method comprises acts of receiving a first value for use in decrypting at least one attribute value, receiving the at least one attribute value in encrypted form, and storing, on the at least one storage device, the first value and the at least one attribute value in encrypted form, wherein the at least one attribute value has been encrypted using a second value and a public key associated with secure hardware, and the second value corresponds to the first value.

In some embodiments, a computer-implemented method is provided. The computer-implemented method comprises acts of receiving a first value for use in decrypting at least one attribute value, receiving the at least one attribute value in encrypted form, and storing, on the at least one storage device, the first value and the at least one attribute value in encrypted form, wherein the at least one attribute value has been encrypted using a second value and a public key associated with secure hardware, and the second value corresponds to the first value.

In some embodiments, a non-transitory computer-readable medium encoded with a plurality of instructions is provided. The plurality of instructions, when executed by at least one computer processor perform a method having acts of receiving a first value for use in decrypting at least one attribute value, receiving the at least one attribute value in encrypted form, and storing, on the at least one storage device, the first value and the at least one attribute value in encrypted form, wherein the at least one attribute value has been encrypted using a second value and a public key associated with secure hardware, and the second value corresponds to the first value.

In some embodiments, a system comprising at least one computer processor and at least one computer-readable medium is provided. The at least one computer-readable medium has encoded thereon instructions which, when executed, cause the at least one computer processor to perform a method. The method comprises acts of receiving, from the first entity, one or more attribute values of a second entity different from the first entity, and a pointer to one or more attribute attestations in a distributed ledger, wherein the one or more attribute attestations correspond, respectively, to the one or more attribute values of the second entity, using the pointer to access the one or more attribute attestations from the distributed ledger, checking the one or more attribute values received from the first entity against the one or more attribute attestations accessed from the distributed ledger, using at least one attribute value of the one or more attribute values to check whether one or more transfer restrictions is violated, and in response to determining that none of the one or more transfer restrictions is violated, authorizing a transfer of one or more digital assets.

In some embodiments, a computer-implemented method is provided. The computer-implemented method comprises acts of receiving, from a first entity, one or more attribute values of a second entity different from the first entity, and a pointer to one or more attribute attestations in a distributed ledger, wherein the one or more attribute attestations correspond, respectively, to the one or more attribute values of the second entity, using the pointer to access the one or more attribute attestations from the distributed ledger, checking the one or more attribute values received from the first entity against the one or more attribute attestations accessed from the distributed ledger, using at least one attribute value of the one or more attribute values to check whether one or more transfer restrictions is violated, and in response to determining that none of the one or more transfer restrictions is violated, authorizing a transfer of one or more digital assets.

In some embodiments, a non-transitory computer-readable medium encoded with a plurality of instructions is provided. The plurality of instructions, when executed by at least one computer processor perform a method having acts of receiving, from a first entity, one or more attribute values of a second entity different from the first entity, and a pointer to one or more attribute attestations in a distributed ledger, wherein the one or more attribute attestations correspond, respectively, to the one or more attribute values of the second entity, using the pointer to access the one or more attribute attestations from the distributed ledger, checking the one or more attribute values received from the first entity against the one or more attribute attestations accessed from the distributed ledger, using at least one attribute value of the one or more attribute values to check whether one or more transfer restrictions is violated, and in response to determining that none of the one or more transfer restrictions is violated, authorizing a transfer of one or more digital assets.

In some embodiments, a system comprising at least one computer processor and at least one computer-readable medium having encoded thereon instructions is provided.

The instructions, when executed, cause the at least one computer processor to perform a method for a first entity. The method comprises acts of receiving, from a second entity different from the first entity, one or more attribute values of the second entity, and a pointer to one or more attribute attestations in a distributed ledger, wherein the one or more attribute attestations correspond, respectively, to the one or more attribute values of the second entity, using the pointer to access the one or more attribute attestations from the distributed ledger, checking the one or more attribute values received from the second entity against the one or more attribute attestations accessed from the distributed ledger; and sending the one or more attribute values of the second entity and the pointer to the one or more attribute attestations to a third entity different from the second entity.

In some embodiments, a computer-implemented method for a first entity is provided. The computer-implemented method comprises acts of receiving, from a second entity different from the first entity, one or more attribute values of the second entity, and a pointer to one or more attribute attestations in a distributed ledger, wherein the one or more attribute attestations correspond, respectively, to the one or more attribute values of the second entity, using the pointer to access the one or more attribute attestations from the distributed ledger, checking the one or more attribute values received from the second entity against the one or more attribute attestations accessed from the distributed ledger; and sending the one or more attribute values of the second entity and the pointer to the one or more attribute attestations to a third entity different from the second entity.

In some embodiments, a non-transitory computer-readable medium encoded with a plurality of instructions is provided. The plurality of instructions, when executed by at least one computer processor perform a method for a first entity, the method having acts of receiving, from a second entity different from the first entity, one or more attribute values of the second entity, and a pointer to one or more attribute attestations in a distributed ledger, wherein the one or more attribute attestations correspond, respectively, to the one or more attribute values of the second entity, using the pointer to access the one or more attribute attestations from the distributed ledger, checking the one or more attribute values received from the second entity against the one or more attribute attestations accessed from the distributed ledger; and sending the one or more attribute values of the second entity and the pointer to the one or more attribute attestations to a third entity different from the second entity.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF DRAWINGS

FIG. 3A shows an illustrative process 300 for attribute attestation by a trusted party, in accordance with some embodiments.

DETAILED DESCRIPTION

Figure 1A:
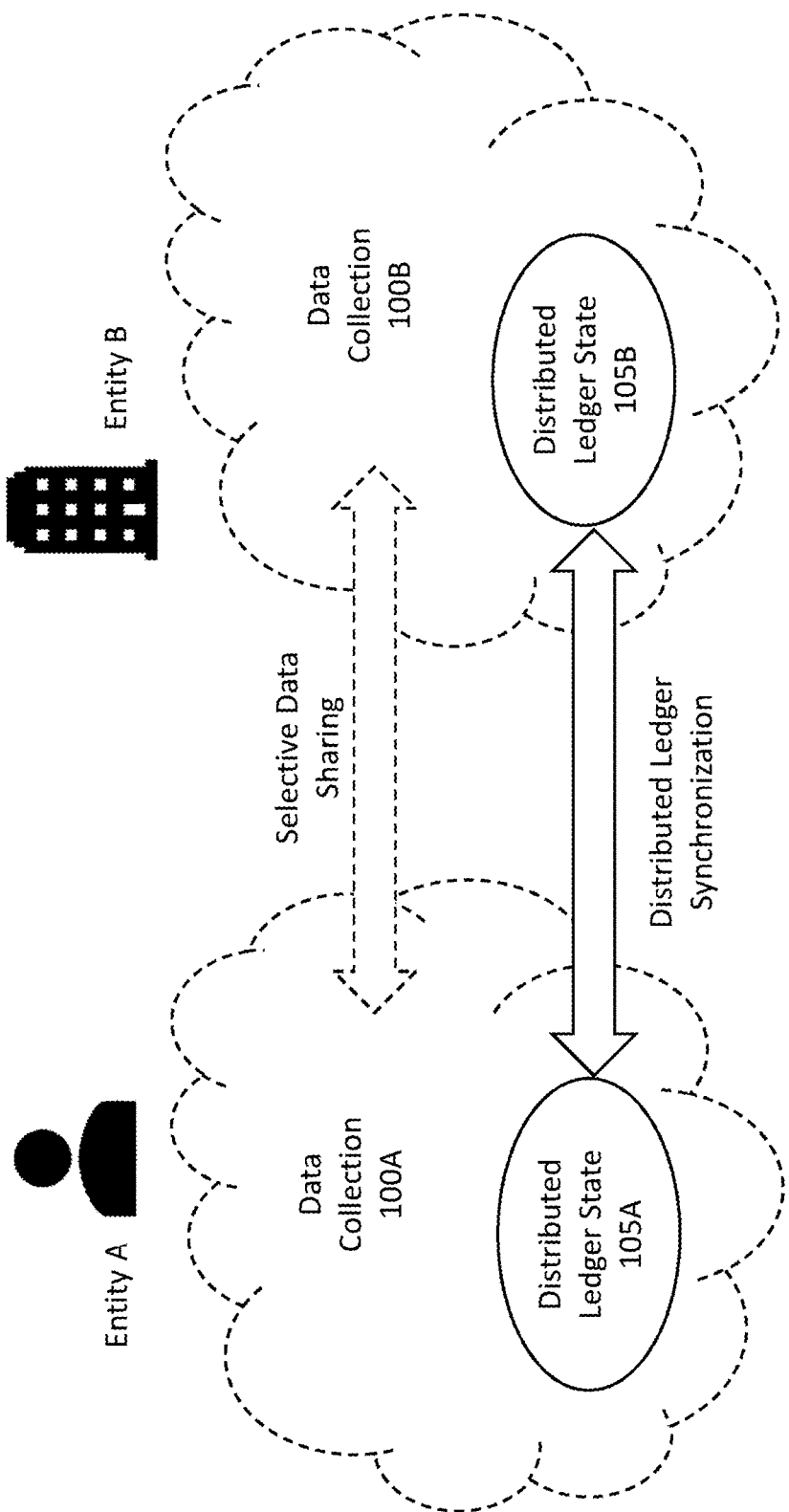
FIG. 1A shows an illustrative data management system 100, in accordance with some embodiments.

Aspects of the present disclosure relate to systems and methods for providing a secure custodial service for managing digital data. Any suitable type of digital data may be managed, including, but not limited to, personally identifiable information (PII), cryptographic keys for accessing digital assets, etc.

The above-referenced '643 and '732 applications describe a data management system in which an entity may have a data management service[1] that handles sensitive data on behalf of the entity. Data management services of different entities may communicate with each other. As one example, a data management service of a user may send attribute values (e.g., date of birth) to a data management service of a trusted party, and may request that the trusted party verify and attest to the attribute values. The trusted party may verify the attribute values in any suitable manner, for instance, by reviewing physical documents (e.g., the user's passport). If the verification is successful, the trusted party may attest to the attribute values, for instance, by electronically signing cryptographic proofs of the attribute values.

[1] The '643 and '732 applications describe personal data services (PDSes), which are examples of data management services.

As another example, a data management service of a user may send attribute values to a data management service of a counterparty. The counterparty may check that the attribute values have been attested to by a trusted party. For instance, the counterparty may check whether cryptographic proofs of the attribute values have been electronically signed by the trusted party.

The inventors have recognized and appreciated various challenges in providing such a data management system. For instance, it may be more efficient and/or more reliable to execute data management services on one or more cloud servers. However, an entity may not wish to expose sensitive data to a cloud computing provider, or even a provider of the data management system. Therefore, it may be desirable to store sensitive data in encrypted form and decrypt only when the sensitive data is shared.

Accordingly, in some embodiments, techniques are provided for encrypting data for storage. For instance, data may be encrypted by a client device of a sender entity, and may be sent to a data management system in encrypted form. The data management system may store the data without decrypting. Subsequently, the data management system may retrieve the data from storage, and use secure hardware to decrypt the data. Additionally, or alternatively, the data may be re-encrypted before leaving the secure hardware, for instance, using one or more keys associated with a recipient entity. In this manner, plaintext data may only exist transiently in the secure hardware.

In some embodiments, a data management system may, prior to re-encrypting and sending data, confirm that a sender entity and a recipient entity are in a trust relationship. For instance, a sender entity may publish a data structure to a distributed ledger, to indicate that the sender entity wishes to share selected data with a recipient entity. The data management system may access this data structure from the distributed ledger, and confirm that the sender entity and the recipient entity are indeed in a trust relationship. Additionally, or alternatively, the data management system may confirm that the data to be re-encrypted and sent to the recipient entity is indicated in the data structure as data to be shared with the recipient entity. For instance, the data management system may confirm that the data structure includes an attestation of an attribute value to be re-encrypted and sent to the recipient entity.

The inventors have further recognized and appreciated that a data management system may be used to provide a custodial key service for managing cryptographic keys of digital assets. In some embodiments, a custodial key service may store a cryptographic key of a digital asset for an owner of the digital asset. If the asset owner wishes to transfer the digital asset to an asset recipient, the asset owner may submit a transfer request to the custodial key service. Upon receiving a transfer request, the custodial key service may check an identity of an entity from which the transfer request is received to confirm that the entity is indeed the asset owner. Additionally, or alternatively, the custodial key service may check an identity of the asset recipient. Additionally, or alternatively, the custodial key service may verify compliance with one or more government regulations for settling, safekeeping, and/or reporting of assets. Once the transfer request is checked, the custodial key service may use the cryptographic key of the digital asset to sign the transfer request. In this manner, the asset owner may authorize the transfer without directly handling the cryptographic key.

In some embodiments, data management services of an asset owner and an asset recipient may form a privacy layer, where sensitive information (e.g., attribute values) may be shared via secure channels to effectuate transfer of a digital asset from the asset owner to the asset recipient. The data management services may have associated distributed ledger clients, which may form a trust layer, where non-sensitive information (e.g., attribute attestations) may be published to a distributed ledger. One or more custodial key services may provide a custodial layer between the trust layer and the privacy layer.

In some embodiments, interactions between an asset owner and one or more custodial key services may not be exposed to an asset recipient. For instance, from the asset recipient's point of view, a transfer of a digital asset may proceed in a same way whether a cryptographic key corresponding to the digital asset is managed by the asset owner or by a custodial key service. In this manner, different custodial key service backend solutions may be supported (e.g., solutions provided by different custodians, different extensions provided by a same custodian, etc.).

In some embodiments, one or more custodial key services may operate as a regulatory layer between a trust layer and a privacy layer. As one example, a custodial key service may store a list of sanctioned entities, and may reject an attempted transfer involving a sanctioned entity. As another example, a custodial key service may reject an attempted transfer into or out of a selected jurisdiction. As yet another example, a custodial key service may reject an attempted transfer that would cause a cryptocurrency account balance to fall below, or exceed, a selected threshold.

It should be appreciated that the techniques introduced above and discussed in greater detail below may be implemented in any of numerous ways, as the techniques are not limited to any particular manner of implementation. Examples of implementation details are provided herein solely for illustrative purposes. Furthermore, the techniques disclosed herein may be used individually or in any suitable combination, as aspects of the present disclosure are not limited to using any particular technique or combination of techniques.

FIG. 1A shows an illustrative data management system 100, in accordance with some embodiments. In this example, the data management system 100 includes data collections 100A and 100B, which may be associated with entities A and B, respectively. The entity A may be of any suitable type, such as user, organization, identifiable object, physical space, etc., and likewise for the entity B.

In some embodiments, the entity A may selectively share, with the entity B, data from the data collection 100A. Additionally, or alternatively, the entity B may selectively share, with the entity A, data from the data collection 100B. For instance, the entities A and B may perform a handshake and establish a secure communication channel, via which data may be transmitted with end-to-end encryption.

In some embodiments, each of the entities A and B may be associated with one or more nodes in a network of nodes that collectively maintain a distributed ledger. The distributed ledger may include digital records replicated among a plurality of nodes in the network. The nodes may carry out a synchronization protocol, whereby a change made at a node to a local copy of a digital record may be propagated through the network, and other nodes may update their respective copies of that digital record accordingly.

In some embodiments, the distributed ledger may be implemented using a blockchain. The blockchain may include a plurality of blocks, where each block may include a plurality of transactions. In some embodiments, the plurality of transactions may be ordered, for example, chronologically. Additionally, or alternatively, each newly added block may be linked to a latest previous block. Such a structure may be resistant to tampering, and may therefore be used to confirm whether a given transaction did take place, and/or when the transaction took place. For instance, a block may be added to the blockchain only if all nodes (or a subset of nodes with sufficient computation power) in a network implementing the blockchain agree on the block.

In some embodiments, a block generating node (sometimes called a miner) may invest computation power to generate a new block that is linked to a latest previous block. The fastest node that is able to solve a computationally intensive mathematical puzzle (e.g., identifying a preimage of a hash with a certain number of leading zeros) may be rewarded with an internal digital asset (e.g., a bitcoin). Depending on how much computation power is available in the network at a given point in time, a more or less complex mathematical puzzle may be used. In this manner, blocks may be generated within a selected time window, and conflicts may be reduced.

It should be appreciated that aspects of the present disclosure are not limited to using a proof-of-work approach to achieve distributed consensus. In some embodiments, a proof-of-stake approach may be used. It should also be appreciated that any suitable blockchain implementation may be used, such as Ethereum, Hyperledger Fabric, etc. Furthermore, aspects of the present disclosure are not limited to using a blockchain to implement a distributed ledger. In some embodiments, one or more directed acyclic graphs (e.g., IOTA Tangle), hashgraphs (e.g. Swirlds), hash trees (e.g., Guardtime keyless signatures infrastructure), and/or distributed ledgers with no globally-shared chain (e.g., R3 Corda), may be used in addition to, or instead of, one or more blockchains.

Returning to FIG. 1A, the entity A may, in some embodiments, maintain a distributed ledger state 105A. The entity A may publish non-sensitive data (e.g., cryptographic proofs of sensitive data) to the distributed ledger by storing the non-sensitive data as part of the distributed ledger state 105A. Likewise, the entity B may maintain a distributed ledger state 105B, and may publish non-sensitive data (e.g., cryptographic proofs of sensitive data) to the distributed ledger by storing the non-sensitive data as part of the distributed ledger state 105B.

In some embodiments, the network nodes associated with the entities A and B may participate in a distributed ledger synchronization protocol, so that non-sensitive data published by the entity A may be replicated in the distributed ledger state 105B maintained by the entity B, and non-sensitive data published by the entity B may be replicated in the distributed ledger state 105A maintained by the entity A.

It should be appreciated that aspects of the present disclosure are not limited to any particular way of maintaining a distributed ledger state. For instance, an entity may maintain a distributed ledger state separately from the entity's data collection, so that non-sensitive data may be stored in the distributed ledger state, as well as in the entity's data collection. Additionally, or alternatively, an entity may maintain a distributed ledger state as part of the entity's data collection (e.g., as shown in FIG. 1A), so that non-sensitive data may not be duplicated. Moreover, in some embodiments, an entity may not maintain a distributed ledger state, and may access a distributed ledger via a node in a network of nodes that collectively maintain the distributed ledger.

Figure 1B:
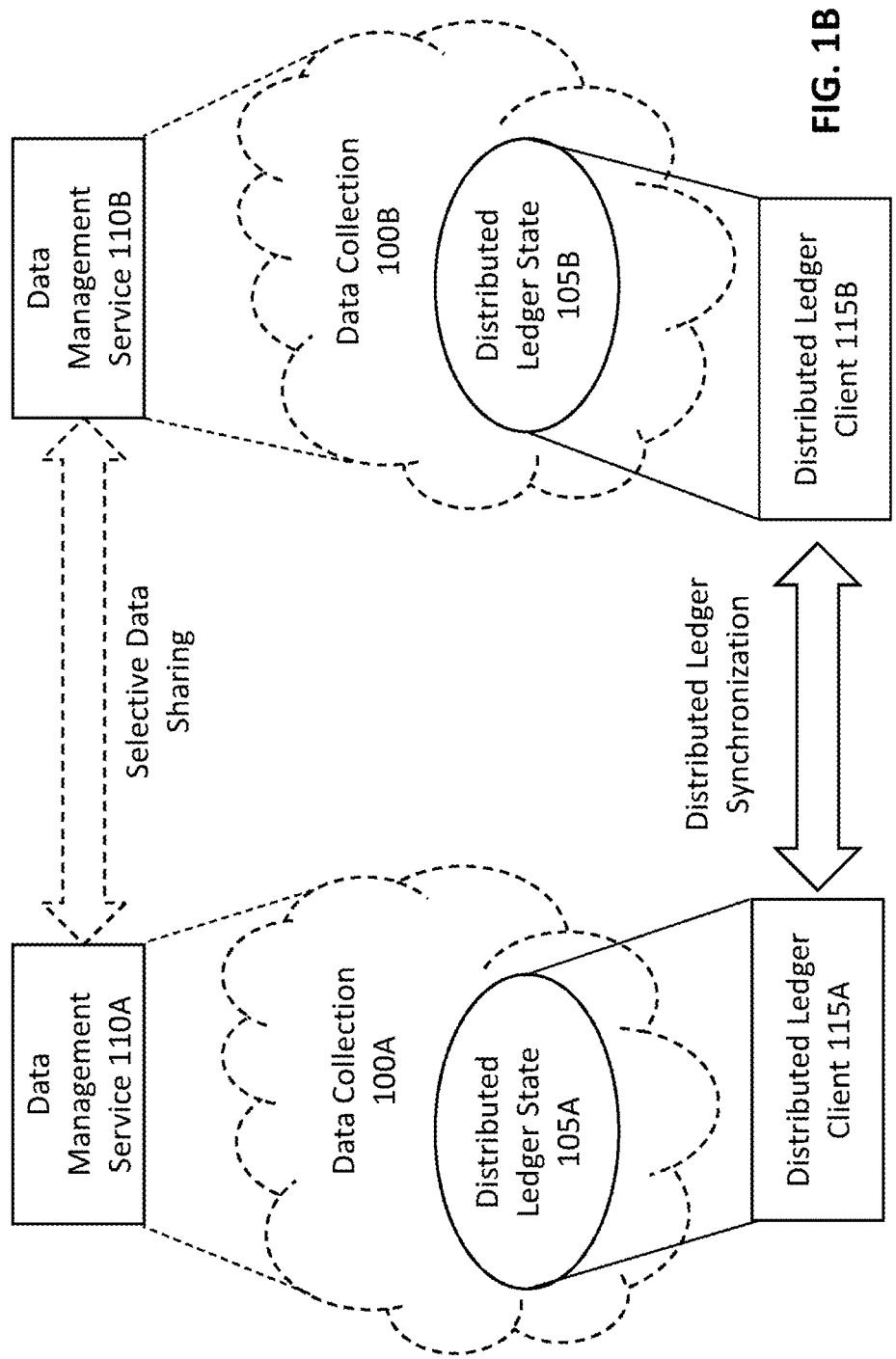
FIG. 1B shows illustrative data management services 110A-B and illustrative distributed ledger clients 115A-B, in accordance with some embodiments.

FIG. 1B shows illustrative data management services 110A-B and illustrative distributed ledger clients 115A-B, in accordance with some embodiments. For instance, the data management services 110A-B may manage, respectively, the illustrative data collections 100A-B in the example of FIG. 1A. Likewise, the distributed ledger clients 115A-B may manage, respectively, the illustrative distributed ledger states 105A-B in the example of FIG. 1A.

In some embodiments, a data management service (e.g., the data management service 110A or 110B) may include a software program for managing personally identifiable information (PII), cryptographic keys for accessing digital assets, and/or other sensitive data. For instance, a data management service may be implemented as a virtual container that wraps the software program in a file system to allow the software program to run consistently in any environment. The file system may include a runtime system, one or more system tools, one or more system libraries, etc. However, it should be appreciated that aspects of the present disclosure are not so limited. In some embodiments, a data management service may simply include a software program for managing sensitive data, without an accompanying file system.

In the example of FIG. 1B, the data management services 100A-B communicate with each other via a secure channel (e.g., with end-to-end encryption) to effectuate selective data sharing between the data collections 100A-B. Additionally, or alternatively, the data management services 110A-B may each provide an application programming interface to one or more applications (not shown). The entities A and B may engage in transactions (e.g., opening an account, making a purchase, accessing data, etc.) via such applications.

In some embodiments, the data collections 100A-B may include values of attributes of the entities A and B (e.g., a birth date, a social security number, a private key associated with a cryptocurrency address, an employer identification number, a device serial number, a building access code, etc.). Cryptographic proofs (e.g., salted hashes) of such attribute values may be stored in the distributed ledger states 105A-B, which may be managed by the distributed ledger clients 115A-B. The distributed ledger clients 115A-B may participate in a distributed ledger protocol to synchronize the distributed ledger states 105A-B with a distributed ledger, thereby publishing the cryptographic proofs to a network of nodes maintaining the distributed ledger.

In some embodiments, a cryptographic proof may be derived in a selected manner from an attribute value of an owner entity, and may be signed by a designated trusted party (e.g., an entity that issued the attribute value, or has verified veracity thereof). A counterparty with which the owner entity has shared the attribute value may readily check that the cryptographic proof was indeed derived from the attribute value in the selected manner, and that the cryptographic proof was indeed signed by the designated trusted party. However, it may be computationally infeasible for another entity to reconstruct the attribute value from the cryptographic proof alone. In this manner, competing objectives of privacy and transparency may be achieved simultaneously.

Although salted hashes are described herein as examples of cryptographic proofs, it should be appreciated that aspects of the present disclosure are not limited to using a hash function to generate a cryptographic proof. In some embodiments, a cryptographic proof may be generated based on factorization, discrete logarithm, etc. Additionally, or alternatively, a cryptographic proof may include a zero knowledge proof (ZKP), such as a non-interactive ZKP (e.g., zk-SNARK).

In some embodiments, the entity A may evidence a trust relationship with the entity B by publishing a data structure to the distributed ledger. For instance, the entity A may assemble one or more attribute attestations into a badge, where an attribute attestation may include a cryptographic proof of an attribute value stored in the data collection 100A of the entity A. The entity A may publish the badge to the distributed ledger with an indication that the badge is associated with the entity B. In this manner, the badge may later be accessed from the distributed ledger as evidence that the entity A has shared the one or more selected attribute values with the entity B, without revealing the attribute values themselves.

Although some details of implementation are described above in connection with FIGS. 1A-B, it should be appreciated that such details are provided solely for purposes of illustration. The techniques introduced above and/or discussed in detail below are not limited to any particular manner of implementation. For instance, while the illustrative data management service 110A and the illustrative distributed ledger client 115A are shown in FIG. 1B as separate components, functionalities of these components may, in some embodiments, be implemented by a single component, and likewise for the illustrative data management service 110B and the illustrative distributed ledger client 115B.

Figure 2A:
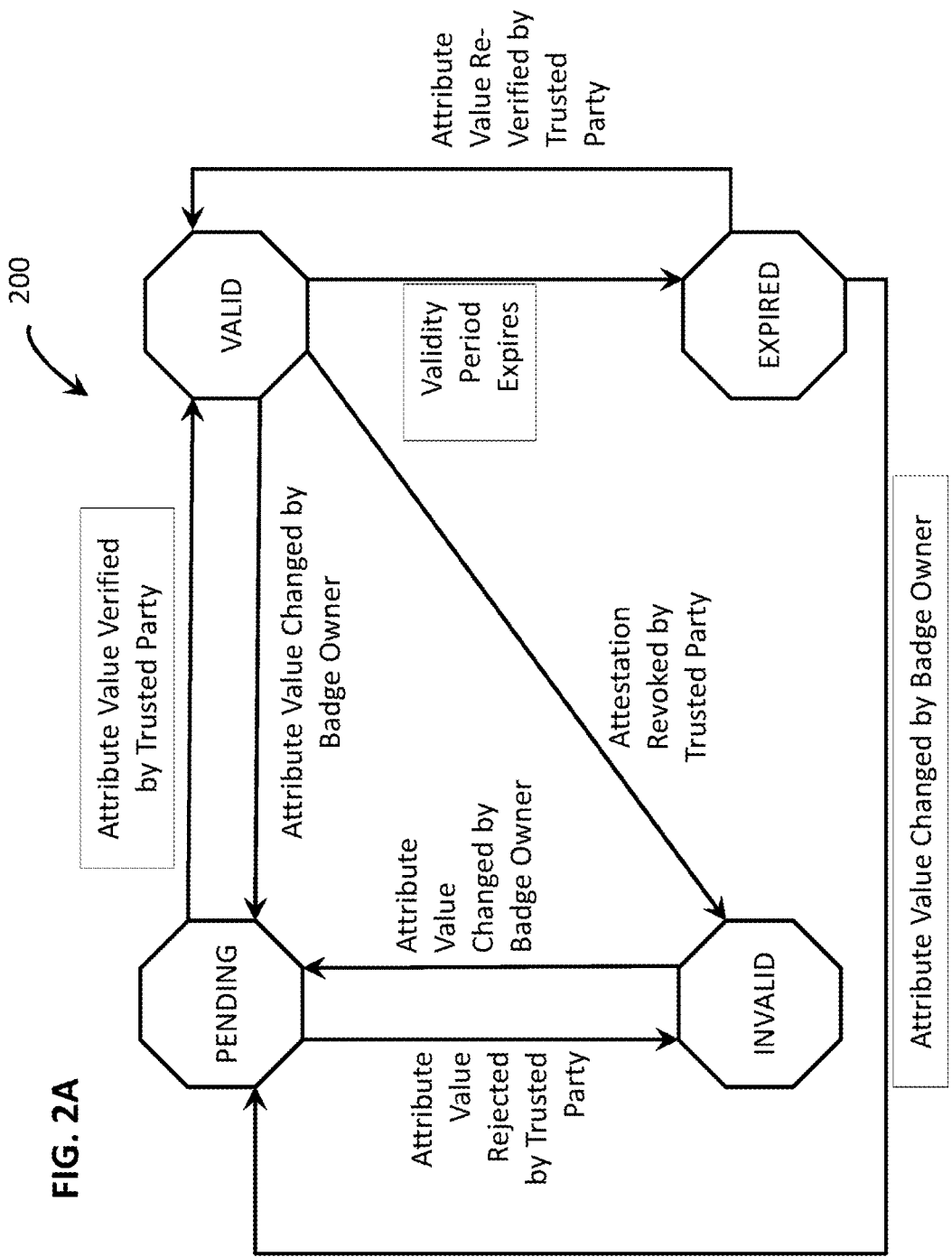
FIG. 2A shows an illustrative state machine 200 that describes transitions among different states of an attribute attestation, in accordance with some embodiments.

FIG. 2A shows an illustrative state machine 200 that describes transitions among different states of an attribute attestation, in accordance with some embodiments. For instance, the state machine 200 may describe state transitions of attribute attestations published by a badge owner to the illustrative distributed ledger states 105A-B in the example of FIG. 1A.

In some embodiments, when an owner creates a badge with an attribute attestation, or adds an attribute attestation to an existing badge, the attribute attestation may be initialized to a PENDING state. In this state, the attribute attestation may be neither valid nor invalid.

In some embodiments, the owner of the badge may request that a trusted party associated with the badge verify an attribute value corresponding to the attribute attestation. If the trusted party successfully verifies the attribute value, the trusted party may cause the attribute attestation to be in a VALID state. If the trusted party rejects the value of the attribute, the trusted party may cause the attribute attestation to be in an INVALID state.

In some embodiments, if the attribute attestation is in the VALID state, the EXPIRED state, or the INVALID state, and the badge owner causes the attribute to have a different value, the attribute attestation may return to the PENDING state.

In some embodiments, if the attribute attestation is in the VALID state, but is revoked by the trusted party, the trusted party may cause the attribute attestation to be in the INVALID state.

In some embodiments, if the attribute attestation is in the VALID state, and a validity period expires, the attribute attestation may move into an EXPIRED state, where the attribute attestation may remain until the trusted party re-verifies the value of the attribute.

It should be appreciated that the state machine 200 is shown in FIG. 2A and described above solely for purposes of illustration, as aspects of the present disclosure are not limited to maintaining states of attribute attestations in any particular manner, or to maintaining such states at all. In some embodiments, a distributed ledger client (e.g., the illustrative distributed ledger client 115A or 115B in the example of FIG. 1B) may be implemented using a smart contract (e.g., an Ethereum smart contract), which may be programmed to maintain states of attribute attestations.[2] However, it should be appreciated that aspects of the present disclosure are not limited to using any particular type of smart contract, or any smart contract at all.

[2] The '643 and '732 applications describe digital identity representations (DIRs), which are examples of distributed ledger clients.

FIG. 3A shows an illustrative process 300 for attribute attestation by a trusted party, in accordance with some embodiments. For instance, the process 300 may be performed between the illustrative entities A and B in the example of FIG. 1A. The entity A may be a user who uses the illustrative data management service 110A to manage attribute values. The entity B may be a trusted party (e.g., a government agency, an employer, a bank, etc.) that verifies one or more attribute values of the entity A, and uses the illustrative data management service 110B to attest to the one or more attribute values. However, it should be appreciated that the techniques described herein may be used to manage any suitable type of data in addition to, or instead of, personal data. For instance, in some embodiments, the process 300 may be used for attestation of attribute values relating to organizations, identifiable objects, physical spaces, etc.

At act 305, the data management service 110A may prepare one or more attribute attestations. For instance, the entity A's data collection (e.g., the illustrative data collection 100A in the example of FIG. 1A) may include attribute values such as date of birth, passport number, credit card number, mailing address, annual income, etc. The data management service 110A may select one or more attribute values to be verified by the entity B, and may generate an attestation for each selected attribute value. For instance, the data management service 110A may generate a cryptographic proof of an attribute value, and may include the cryptographic proof in the attestation. The cryptographic proof may be generated in any suitable manner, as aspects of the present disclosure are not so limited. For instance, in some embodiments, a cryptographic hash function may be applied to the attribute value, with or without a randomly generated salt.

In some embodiments, an attestation may include one or more items of metadata, such as metadata indicating how a cryptographic proof in the attestation was generated and/or how the cryptographic proof is to be checked. For instance, the attestation may include metadata identifying a cryptographic scheme (e.g., a cryptographic hash function, an asymmetric cryptosystem, etc.) used to generate the cryptographic proof. Additionally, or alternatively, an attestation may include metadata indicating that the attestation is to be signed by a selected entity (e.g., the entity B). However, it should be appreciated that aspects of the present disclosure are not limited to having any particular type of metadata, or any metadata at all, in an attestation.

In some embodiments, the data management service 110A may organize the one or more attribute attestations into a badge, and may include in the badge an indication that the badge is to be presented to a selected entity (e.g., a service provider from which the entity A is requesting a service). However, it should be appreciated that aspects of the present disclosure are not limited to organizing attribute attestations into a badge.

At act 310, the data management service 110A may cause the one or more attribute attestations to be published to a distributed ledger. For instance, in some embodiments, the data management service 110A may request that the illustrative distributed ledger client 115A in the example of FIG. 1B publish the one or more attribute attestations. In response, the distributed ledger client 115A may publish the one or more attribute attestations, and may set a state of each such attribute attestation to PENDING.

At act 315, the data management service 110A may send the one or more selected attribute values to the data management service 110B via a secure channel that is outside the distributed ledger. The data management service 110A may also include relevant metadata, such as metadata for use in checking a cryptographic proof of an attribute value. For instance, the cryptographic proof may have been generated using a suitable cryptographic scheme (e.g., a cryptographic hash function, an asymmetric cryptosystem, etc.), and the metadata may include an input to the cryptographic scheme (e.g., a randomly generated salt that was input to the cryptographic hash function, an initialization vector that was input to the asymmetric cryptosystem, etc.). However, it should be appreciated that aspects of the present disclosure are not limited to generating cryptographic proofs in any particular manner.

In some embodiments, the data management service 110A may send, via the secure channel to the data management service 110B, a distributed ledger reference that may be used by the data management service 110B to look up the one or more attribute attestations from the distributed ledger. For instance, the distributed ledger client 115A may be implemented using a smart contract, and the distributed ledger reference may include a reference to a distributed ledger transaction whereby the smart contract is recorded on the distributed ledger. Additionally, or alternatively, the one or more attribute attestations may be organized into a badge, and the distributed ledger reference may include a reference to a distributed ledger transaction whereby the badge is recorded on the distributed ledger.

In some embodiments, the entity A may have a distributed ledger address, and the referenced distributed ledger transaction may be signed using a private key associated with that distributed ledger address. This private key may be managed by the distributed ledger client 115A, and the data management service 110A may cause the distributed ledger client 115A to use the private key to generate a signature over an attribute value being sent to the data management service 110B. The data management service 110A may send the signature to the data management service 110B along with the attribute value. This may bind the attribute value to the referenced distributed ledger transaction, because the data management service 110B may use the distributed ledger address to look up a public key from the distributed ledger, and may use that public key to check that both the attribute value and the referenced distributed ledger transaction are signed using the same private key.

At act 320, the data management service 110B may cause a received attribute value to be verified directly, for example, by physically examining documentation (e.g., passport, credit card, utility statement, paystub, etc.) and/or biometric features (e.g., fingerprint, iris, voice, etc.).

Additionally, or alternatively, the data management service 110B may verify a received attribute value indirectly, for example, based on a referenced attestation. For instance, in some embodiments, entities may form a trust structure, in which an entity may trust one or more other entities, and may rely upon attribute attestations signed by any of the one or more other entities. In this manner, an entity may be able to verify an attribute value without having to perform a physical verification.

Accordingly, in some embodiments, the data management service 110A may provide, to the data management service 110B, a distributed ledger reference to an attestation previously signed by another entity, where the previously signed attestation is for the same attribute value being verified by the data management service 110B. The data management service 110B may look up the previously signed attestation from the distributed ledger, and may perform one or more checks. For instance, the data management service 110B may check that: (i) the other entity is trusted by the entity B (e.g., by looking up a list of trusted entities), (ii) a cryptographic proof in the previously signed attestation is generated from the received attribute value using a cryptographic scheme indicated in the previously signed attestation, (iii) the previously signed attestation is in a VALID state, and/or (iv) the previously signed attestation is signed using the other entity's private key. Any suitable electronic signature scheme may be used, as aspects of the present disclosure are not so limited.

Returning to act 320 in the example of FIG. 3A, the data management service 110B may use a distributed ledger reference received at act 315 to look up, from the distributed ledger, the one or more attribute attestations to be signed by the data management service 110B. In some embodiments, the data management service 110B may check that a cryptographic proof in each such attribute attestation is generated from the corresponding received attribute value, using a cryptographic scheme indicated in the attribute attestation.

Additionally, or alternatively, the data management service 110B may use the distributed ledger reference received at act 315 to authenticate a received attribute value. For instance, the data management service 110B may use a distributed ledger address associated with the distributed ledger reference to look up a public key from the distributed ledger, and may use the public key to check a signature of the received attribute value. In some embodiments, if each received attribute value is successfully verified (directly or indirectly) and authenticated, and the corresponding attribute attestation is successfully checked, the data management service 110B may, at act 325, sign the attribute attestation using a private key associated with the entity B. Any suitable electronic signature scheme may be used, as aspects of the present disclosure are not so limited. In some embodiments, the entity B may have an associated distributed ledger address, and a private key associated with that distributed ledger address may be managed by the illustrative distributed ledger client 115B in the example of FIG. 1B. The data management service 110B may cause the distributed ledger client 115B to use the private key to generate a signature over the attribute attestation. In this manner, an entity checking the attribute attestation (e.g., an illustrative entity C in the example of FIG. 4) may use the entity B's distributed ledger address to look up a public key from the distributed ledger, and may use that public key to check the signature over the attribute attestation.

Additionally, or alternatively, the data management service 110B may cause a state of the attribute attestation to be changed to VALID. For instance, the data management service 110B may request that the illustrative distributed ledger client 115B in the example of FIG. 1B change the state of the attribute attestation to VALID.

Although some details of implementation are described above in connection with FIG. 3A, it should be appreciated that such details are provided solely for purposes of illustration. Aspects of the present disclosure are not limited to any particular manner of implementation. For instance, in some embodiments, the data management service 110A may cause the distributed ledger client 115A to trigger an on-ledger event (e.g., a "Verification Request" event) to notify the distributed ledger client 115B that the one or more attribute attestations are pending verification by the entity B. In response, the data management service 110B may query the data management service 110A for the one or more attribute values. Additionally, or alternatively, the data management service 110A may cause the distributed ledger client 115A to send the one or more attribute values to the distributed ledger client 115B via the distributed ledger. The distributed ledger client 115B may in turn provide the one or more attribute values to the data management service 110B. The one or more attribute values may be encrypted for transmission, for example, using a public key associated with the distributed ledger client 115B.

Figure 4:
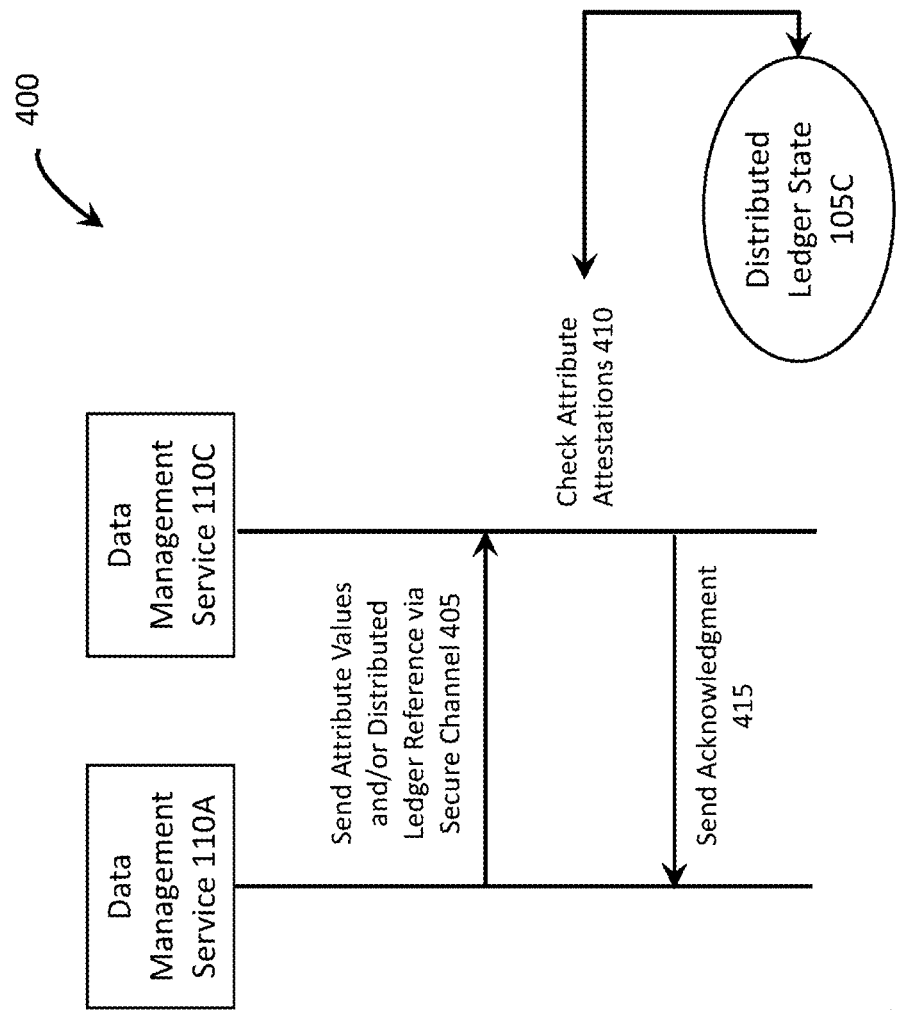
FIG. 4 shows an illustrative process 400 for a counterparty check, in accordance with some embodiments.

FIG. 4 shows an illustrative process 400 for a counterparty check, in accordance with some embodiments. For instance, the process 400 may be performed between the illustrative entity A in the example of FIGS. 1A-B and an entity C (not shown). The entity A may be a user who uses the illustrative data management service 110A to manage attribute values. The entity C may be a counterparty that receives one or more attribute values from the entity A, and uses a data management service 110C to check an attestation of each of the one or more attribute values. For instance, the entity C may be a service provider (e.g., a bank). Before the entity C provides a service to the entity A (e.g., opening a bank account), the entity C may request that the entity A provide a selected set of attribute values (e.g., per anti-money-laundering regulations). However, it should be appreciated that the techniques described herein may be used to check attestations of any suitable type of data in addition to, or instead of, personal data. For instance, in some embodiments, the process 400 may be used to check attestations of attribute values relating to organizations, identifiable objects, physical spaces, etc.

In some embodiments, the process 400 may be triggered when the entity A begins an interaction with the entity C. For instance, the data management services 110A and 110C may each provide an application programming interface to a respective application (not shown). The entity A's application may send a service request to the entity C's application. In response, the entity C's application may indicate one or more selected attributes, for each of which an attestation is to be checked. Accordingly, the entity A may prepare one or more attestations for the one or more attributes indicated by the entity C, publish the one or more attestations to a distributed ledger, and request that a trusted entity (e.g., the illustrative entity B in the example of FIG. 1A) sign the one or more attestations. This may be done, for example, via the illustrative process 300 in the example of FIG. 3A. Additionally, or alternatively, the entity A may request that a trusted entity (e.g., the illustrative entity B in the example of FIG. 1A) issue one or more values for the one or more attributes indicated by the entity C, and publish one or more corresponding attestations to a distributed ledger. This may be done, for example, via the illustrative process 350 in the example of FIG. 3B (described below).

Returning to FIG. 4, the data management service 110A may, at act 405, send one or more values of the one or more selected attributes to the data management service 110C via a secure channel that is outside the distributed ledger. The data management service 110A may also send relevant metadata along with the one or more attribute values, such as one or more inputs used to generate the one or more attestations. However, it should be appreciated that aspects of the present disclosure are not limited to generating an attestation in any particular manner.

In some embodiments, the data management service 110A may send, via the secure channel to the data management service 110C, a distributed ledger reference that may be used by the data management service 110C to look up, from the distributed ledger, the one or more attestations corresponding, respectively, to the one or more attributes indicated by the entity C.

In some embodiments, a distributed ledger client used by the entity A (e.g., the illustrative distributed ledger client 115A in the example of FIG. 1B) may be implemented using a smart contract, and the distributed ledger reference sent to the data management service 110C may include a reference to a distributed ledger transaction whereby the smart contract is recorded on the distributed ledger. Additionally, or alternatively, the one or more attestations may be organized into a badge, and the distributed ledger reference may include a reference to a distributed ledger transaction whereby the badge is recorded on the distributed ledger.

However, it should be appreciated that aspects of the present disclosure are not limited to any particular manner of implementing a distributed ledger client, or any particular way of organizing attestations.

In some embodiments, the entity A may have a distributed ledger address, and the referenced distributed ledger transaction may be signed using a private key associated with that distributed ledger address. This private key may be managed by the distributed ledger client 115A, and the data management service 110A may cause the distributed ledger client 115A to use the private key to generate a signature over an attribute value being sent to the data management service 110C. The data management service 110A may send the signature to the data management service 110C along with the attribute value. This may bind the attribute value to the referenced distributed ledger transaction, because the data management service 110C may use the distributed ledger address to look up a public key from the distributed ledger, and may use that public key to check that both the attribute value and the referenced distributed ledger transaction are signed using the same private key.

At act 410, the data management service 110C may use a distributed ledger reference received at act 405 to retrieve one or more attestations from a distributed ledger. For instance, in some embodiments, the entity C may maintain a distributed ledger state 105C, which may include a local copy of the distributed leger.

In some embodiments, the data management service 110C may perform one or more checks on a retrieved attestation. For instance, the data management service 110C may check that:

(i) an entity that signed the attestation (e.g., the illustrative entity B in the example of FIG. 1A) is trusted by the entity C (e.g., by looking up a list of trusted entities);
(ii) a cryptographic proof in the attestation is generated from a corresponding attribute value received from the entity A, and is generated using a cryptographic scheme indicated in the attestation;
(iii) the attestation is in a VALID state; and/or
(iv) the attestation is signed using the trusted entity's private key.

Additionally, or alternatively, the data management service 110C may use the distributed ledger reference received at act 405 to authenticate a received attribute value. For instance, the data management service 110C may use a distributed ledger address associated with the distributed ledger reference to look up a public key from the distributed ledger, and may use the public key to check a signature of the received attribute value.

In some embodiments, if each received attribute value is successfully authenticated, and the corresponding attestation is successfully checked, the data management service 110C may, at act 415, send to the data management service 110A an indication that access has been granted to the service requested by the entity A. If any attestation is not successfully checked, the data management service 110C may, at act 415, send to the data management service 110A an indication that access has been denied to the service requested by the entity A. However, it should be appreciated that aspects of the present disclosure are not limited to notifying the entity A in any particular manner, or at all. In some embodiments, the data management service 110C may provide an indication of a successful or failed check to the entity C's application (not shown), along with the one or more attribute values received from the entity A. The entity C's application may perform additional checks on the one or more attribute values (e.g., per anti-money-laundering regulations), and may notify the entity A's application (not shown) accordingly.

Although some details of implementation are described above in connection with FIG. 4, it should be appreciated that such details are provided solely for purposes of illustration. Aspects of the present disclosure are not limited to any particular manner of implementation. For instance, in some embodiments, the data management service 110A may cause the distributed ledger client 115A to trigger an on-ledger event (e.g., an "Attestation Check" event) to notify a distributed ledger client 115C (not shown) of the entity C that the one or more attribute attestations are ready to be checked by the entity C. In response, the data management service 110C may query the data management service 110A for the one or more attribute values. Additionally, or alternatively, the data management service 110A may cause the distributed ledger client 115A to send the one or more attribute values to the distributed ledger client 115C via the distributed ledger. The distributed ledger client 115C may in turn provide the one or more attribute values to the data management service 110C. The one or more attribute values may be encrypted for transmission, for example, using a public key associated with the distributed ledger client 115C.

In some embodiments, a trusted party (e.g., the illustrative entity B in the example of FIG. 1A) may issue one or more attribute values to an owner (e.g., the illustrative entity A in the example of FIG. 1A), in addition to, or instead of verifying one or more attribute values received from the owner. The trusted party may prepare an attestation for such an attribute value, and may publish the attestation to the distributed ledger. The trusted party may send the attribute value to the owner, and the owner may accept or reject the attribute value.

Figure 2B:
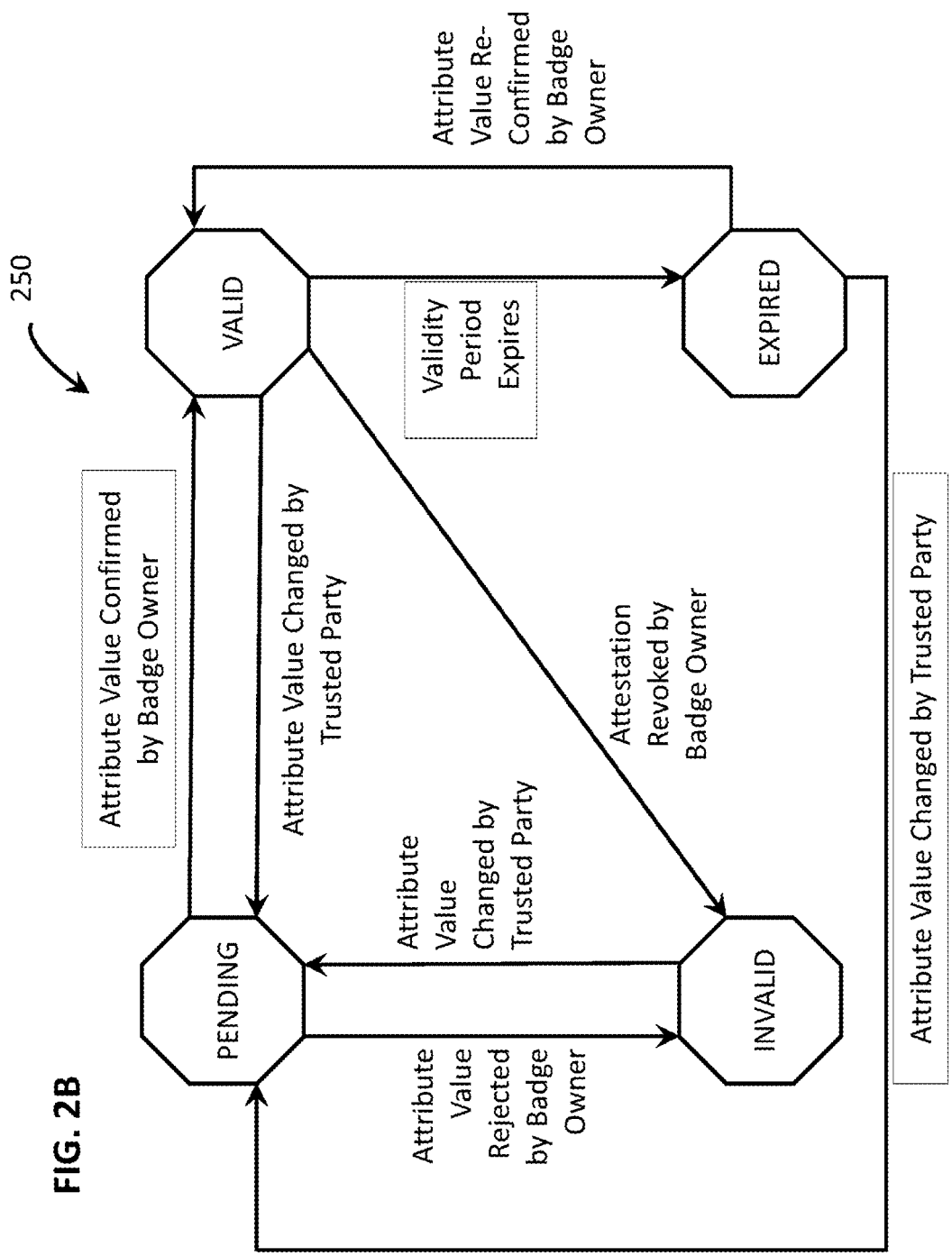
FIG. 2B shows another illustrative state machine 250 that describes transitions among different states of an attribute attestation, in accordance with some embodiments.

FIG. 2B shows another illustrative state machine 250 that describes transitions among different states of an attribute attestation, in accordance with some embodiments. For instance, the state machine 250 may describe state transitions of attribute attestations published by a trusted party to the illustrative distributed ledger states 105A-B in the example of FIG. 1A.

In some embodiments, a trusted party may issue an attribute value to an owner. As one example, the trusted party may be a government agency, and may issue an attribute value such as a passport number, a social security number, a driver's license number, etc. As another example, the trusted party may be an employer, and may issue an attribute value such as a position, an annual salary, a duration of employment, etc. As yet another example, the trusted party may be a bank, and may issue an attribute value such as a monthly statement, an amount of available funds, an amount of available credit, etc.

In some embodiments, the trusted party may create a badge with an attestation for the attribute value, or add the attestation to an existing badge of the owner. The attribute attestation may be initialized to a PENDING state. In this state, the attribute attestation may be neither valid nor invalid.

In some embodiments, the trusted party may send the attribute value to the badge owner. The badger owner may confirm whether the attribute value is accurate or otherwise acceptable. If the badger owner accepts the attribute value, the badge owner may cause the attribute attestation to be in a VALID state. If the badge owner rejects the attribute value, the badge owner may cause the attribute attestation to be in an INVALID state.

In some embodiments, if the attribute attestation is in the VALID state, the EXPIRED state, or the INVALID state, and the trusted party causes the attribute to have a different value, the attribute attestation may return to the PENDING state.

In some embodiments, if the attribute attestation is in the VALID state, but the attribute value is no longer deemed acceptable by the badge owner, the badge owner may cause the attribute attestation to be in the INVALID state.

In some embodiments, if the attribute attestation is in the VALID state, and a validity period expires, the attribute attestation may move into an EXPIRED state, where the attribute attestation may remain until the badge owner re-confirms the attribute value.

It should be appreciated that the state machine 250 is shown in FIG. 2B and described above solely for purposes of illustration, as aspects of the present disclosure are not limited to maintaining states of attribute attestations in any particular manner, or to maintaining such states at all. In some embodiments, a distributed ledger client (e.g., the illustrative distributed ledger client 115A or 115B in the example of FIG. 1B) may be implemented using a smart contract (e.g., an Ethereum smart contract), which may be programmed to maintain states of attribute attestations. However, it should be appreciated that aspects of the present disclosure are not limited to using any particular type of smart contract, or any smart contract at all.

Figure 3B:
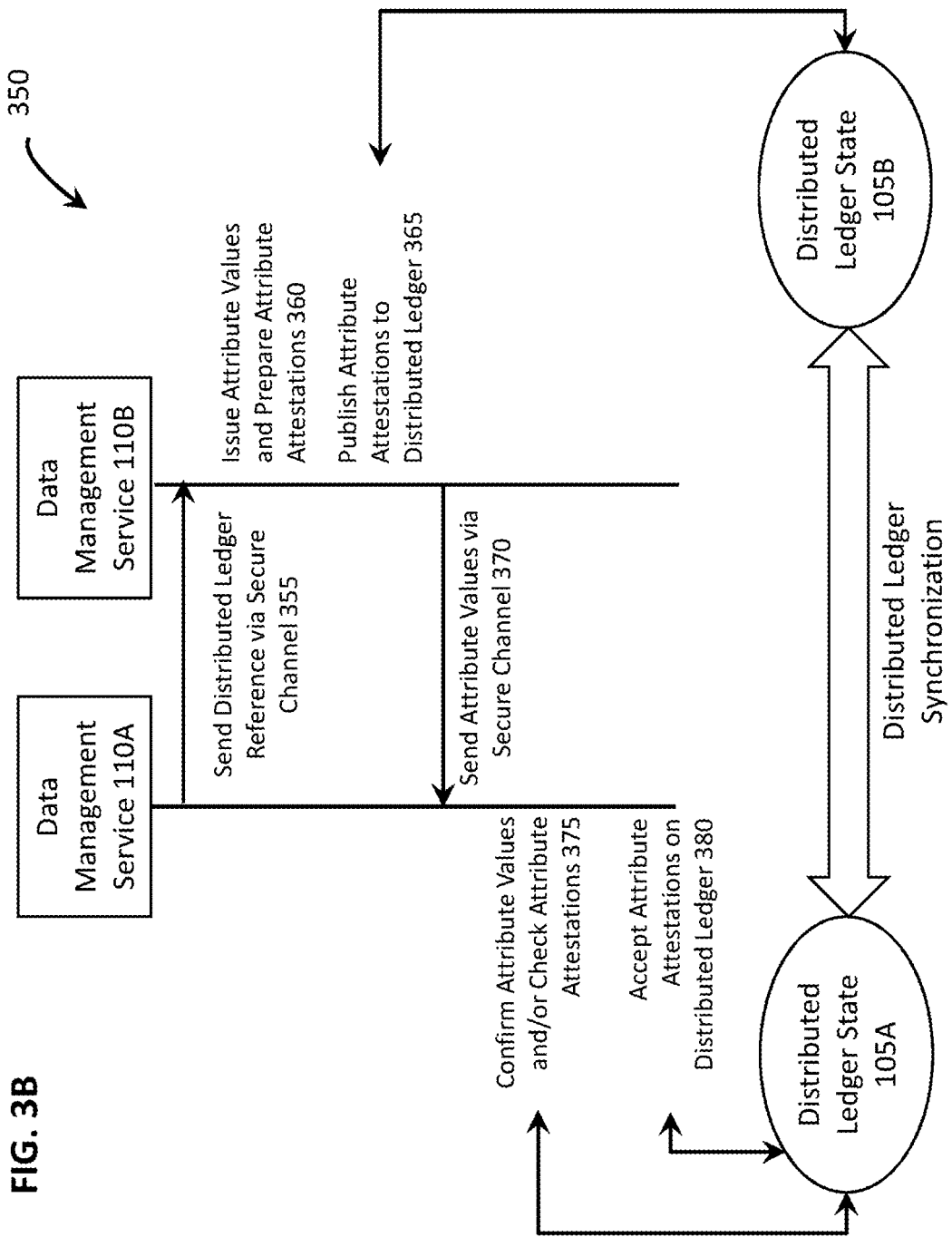
FIG. 3B shows an illustrative process 350 for attribute issuance by a trusted party, in accordance with some embodiments.

FIG. 3B shows an illustrative process 350 for attribute issuance by a trusted party, in accordance with some embodiments. For instance, the process 300 may be performed between the illustrative entities A and B in the example of FIG. 1A. The entity A may be a user who uses the illustrative data management service 110A to manage attribute values. The entity B may be a trusted party (e.g., a government agency, an employer, a bank, etc.) that issues one or more attribute values to the entity A, and uses the illustrative data management service 110B to publish one or more corresponding attribute attestations. However, it should be appreciated that the techniques described herein may be used to manage any suitable type of data in addition to, or instead of, personal data. For instance, in some embodiments, the process 350 may be used for attestation of attribute values relating to organizations, identifiable objects, physical spaces, etc.

At act 355, the data management service 110A may send, via a secure channel, to the data management service 110B, a distributed ledger reference that may be used by the data management service 110B to publish one or more attribute attestations to a distributed ledger. For instance, the illustrative distributed ledger client 115A in the example of FIG. 1B may be implemented using a smart contract, and the distributed ledger reference may include a reference to the smart contract. Additionally, or alternatively, the one or more attribute attestations may be organized into a badge, and the distributed ledger reference may include a reference to the badge.

In some embodiments, the secure channel may be outside the distributed ledger. Additionally, or alternatively, the data management service 110A may cause the distributed ledger client 115A to trigger an on-ledger event (e.g., an "Attribute Request" event) to notify the illustrative distributed ledger client 115B in the example of FIG. 1B that the entity A requests issuance of one or more values of one or more selected attributes.

At act 360, the data management service 110B may issue one or more attribute values, and may prepare one or more corresponding attribute attestations. For instance, the data management services 110A-B may each provide an application programming interface to a respective application (not shown). The entity A's application may send a request to the entity B's application for one or more selected attributes (e.g., a passport number, an annual salary, an account balance, etc.). In response, the entity B's application may create one or more values for the one or more requested attributes, and may invoke the data management service 110B with the one or more attribute values.

In some embodiments, the data management service 110B may generate an attestation for each attribute value. For instance, the data management service 110B may generate a cryptographic proof of an attribute value, and may include the cryptographic proof in the attestation. The cryptographic proof may be generated in any suitable manner, as aspects of the present disclosure are not so limited. For instance, in some embodiments, a cryptographic hash function may be applied to the attribute value, with or without a randomly generated salt.

In some embodiments, an attestation may include one or more items of metadata, such as metadata indicating how a cryptographic proof in the attestation was generated and/or how the cryptographic proof is to be checked. For instance, the attestation may include metadata identifying a cryptographic scheme (e.g., a cryptographic hash function, an asymmetric cryptosystem, etc.) used to generate the cryptographic proof. Additionally, or alternatively, an attestation may include metadata indicating that the attestation is signed by the entity B. However, it should be appreciated that aspects of the present disclosure are not limited to having any particular type of metadata, or any metadata at all, in an attestation.

In some embodiments, the data management service 110B may sign an attestation, for example, using a private key associated with the entity B. Any suitable electronic signature scheme may be used, as aspects of the present disclosure are not so limited. In some embodiments, the entity B may have an associated distributed ledger address, and a private key associated with that distributed ledger address may be managed by the distributed ledger client 115B. The data management service 110B may cause the distributed ledger client 115B to use the private key to generate a signature over the attribute attestation. In this manner, an entity checking the attribute attestation (e.g., the illustrative entity C in the example of FIG. 4) may use the entity B's distributed ledger address to look up a public key from the distributed ledger, and may use that public key to check the signature over the attribute attestation.

At act 365, the data management service 110B may cause the one or more attribute attestations to be published to the distributed ledger. For instance, in some embodiments, the data management service 110B may request that the distributed ledger client 115B publish the one or more attribute attestations using the distributed ledger reference received at act 355 from the data management service 110A. In response, the distributed ledger client 115B may publish the one or more attribute attestations, and may set a state of each such attribute attestation to PENDING.

At act 370, the data management service 110B may send the one or more attribute values to the data management service 110A via a secure channel that is outside the distributed ledger. Additionally, or alternatively, the data management service 110B may cause the distributed ledger client 115B to send the one or more attribute values to the distributed ledger client 115A via the distributed ledger. The distributed ledger client 115A may in turn provide the one or more attribute values to the data management service 110A.

The one or more attribute values may be encrypted for transmission, for example, using a public key associated with the distributed ledger client 115A. In some embodiments, this public key may be looked up from the distributed ledger using a distributed ledger address associated with the entity A. Additionally, or alternatively, the one or more attribute values may be signed using the private key associated with the entity B's distributed ledger address.

In some embodiments, the data management service 110B may send relevant metadata to the data management service 110A, such as metadata for use in checking a cryptographic proof of an attribute value. For instance, the cryptographic proof may have been generated using a suitable cryptographic scheme (e.g., a cryptographic hash function, an asymmetric cryptosystem, etc.), and the metadata may include an input to the cryptographic scheme (e.g., a randomly generated salt that was input to the cryptographic hash function, an initialization vector that was input to the asymmetric cryptosystem, etc.). However, it should be appreciated that aspects of the present disclosure are not limited to generating cryptographic proofs in any particular manner.

At act 375, the data management service 110A may cause a received attribute value to be confirmed. For instance, the entity A may be prompted to review the attribute value. Additionally, or alternatively, the data management service 110A may verify whether the attribute value is consistent with one or more other attribute values in a data collection of the entity A (the illustrative data collection 100A in the example of FIG. 1A).

Additionally, or alternatively, the data management service 110A may use the distributed ledger reference sent to the data management service 110B at act 355 to look up a corresponding attribute attestation from the distributed ledger, and may perform one or more checks. For instance, the data management service 110A may check that: (i) a cryptographic proof in the attribute attestation is generated from the received attribute value using a cryptographic scheme indicated in the attribute attestation, and/or (ii) the attribute attestation is signed using the entity B's private key.

Additionally, or alternatively, the data management service 110A may authenticate the one or more attribute values by checking that the one or more attribute values are signed using the entity B's private key.

In some embodiments, if each received attribute value is successfully confirmed and authenticated, and the corresponding attribute attestation is successfully checked, the data management service 110A may, at act 380, cause a state of the attribute attestation to be changed to VALID. For instance, the data management service 110A may request that the distributed ledger client 115A change the state of the attribute attestation to VALID.

Although some details of implementation are described above in connection with FIG. 3B, it should be appreciated that such details are provided solely for purposes of illustration. Aspects of the present disclosure are not limited to any particular manner of implementation. For instance, in some embodiments, a distributed ledger reference may be sent from the data management service 110B to the data management service 110A, as opposed to being sent from the data management service 110A to the data management service 110B. The distributed ledger reference may point to a badge newly created by the entity B for the entity A. However, it should be appreciated that aspects of the present disclosure are not limited to organizing attribute attestations into a badge.

In some embodiments, an entity may have multiple roles in a data management system. For instance, when a user applies for a line of credit from a bank, the bank may be a counterparty that checks one or more attribute attestations signed by a trusted party (e.g., via the illustrative process 400 in the example of FIG. 4). Subsequently, when the user draws from the line of credit, the bank may issue monthly statements listing the user's transactions, balance owed, available credit, etc. The bank may prepare attestations of such statements and/or information listed therein, and may publish the attestations to a distributed ledger (e.g., via the illustrative process 350 in the example of FIG. 3B).

The inventors have recognized and appreciated various challenges in providing data management services such as the illustrative data management services 110A-C in the examples of FIGS. 3A-B and 4. For instance, it may be more efficient and/or more reliable to execute one or more data management services on a cloud server. However, the entity A may not wish to expose sensitive data to a cloud computing provider, or a provider of the data management service 110A. Therefore, it may be desirable to keep attribute values in encrypted form and decrypt only when the attribute values are shared.

The inventors have further recognized and appreciated that, in a practical implementation of a cryptosystem, security may depend on proper handling of cryptographic keys (e.g., key generation, key storage, key usage, etc.). For instance, while a highly secure technique (e.g., AES with 256-bit keys) may be used to encrypt sensitive data, such encryption may afford little protection if an attacker is able to easily gain access to the keys.

Figure 5:
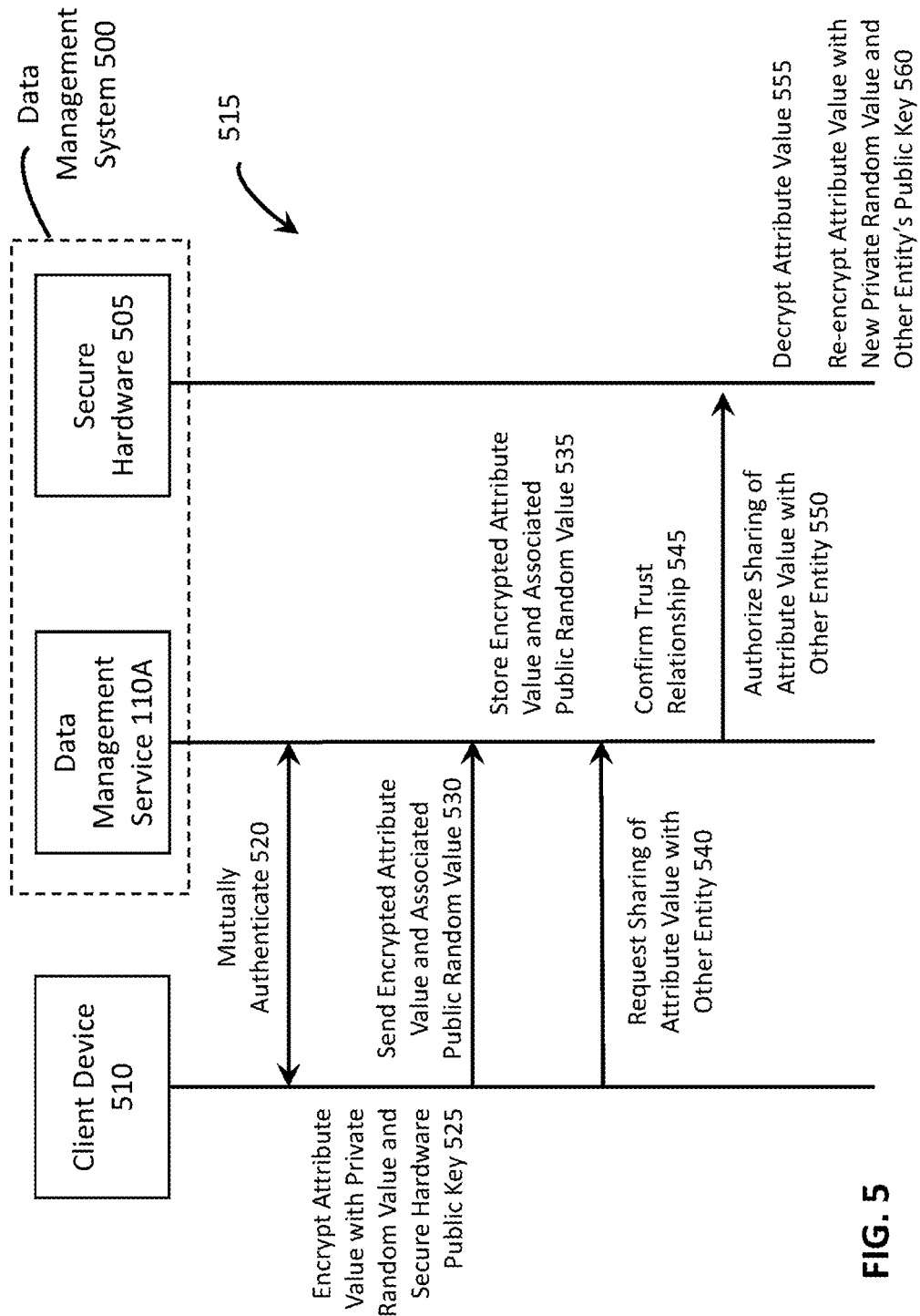
FIG. 5 shows an illustrative data management system 500 and an illustrative process 515 for secure transmission and/or storage of data, in accordance with some embodiments.

FIG. 5 shows an illustrative data management system 500, in accordance with some embodiments. For instance, the data management system 500 may include the illustrative data management service 110A in the example of FIG. 1B, as well as secure hardware 505. Additionally, or alternatively, the data management system 500 may communicate with a client device 510, which may be used by the illustrative entity A in the example of FIG. 1A.

In some embodiments, the secure hardware 505 may be configured to provide secure handling of cryptographic keys. For instance, the secure hardware 505 may be constructed to provide tamper detection (e.g., an irreversible physical change as a result of tampering), tamper resistance (e.g., a tamper resistant housing), tamper response (e.g., deletion of cryptographic keys upon detection of tampering), and/or other security features. Additionally, or alternatively, the secure hardware 505 may be configured to perform encryption, decryption, and/or other cryptographic operations.

In some embodiments, the data management system 500 may receive sensitive data from the client device 510. For instance, the data management service 110A may receive, from the client device, one or more attribute values of the entity A, and may manage the one or more attribute values on behalf of the entity A. The one or more attribute values may be received in encrypted form, and may remain encrypted in a storage used by the data management service 110A.

FIG. 5 shows an illustrative process 515 that may be performed between the data management system 500 and the client device 510, in accordance with some embodiments. The process 515 may be initiated when the entity A wishes to send one or more attribute values to the data management service 110A, for example, to be verified and/or attested to by a trusted party (e.g., as described herein in connection with the example of FIG. 3A), and/or to be shared with a counterparty (e.g., as described herein in connection with the example of FIG. 4).

At act 520, the client device 510 and the data management service 110A may authenticate each other. Any suitable authentication technique may be used. For instance, the client device 510 may demonstrate to the data management service 110A that the client device 510 is in possession of a private key associated with a distributed ledger address of the entity A (e.g., by publishing one or more transactions). Additionally, or alternatively, the client device 510 may demonstrate to the data management service 110A that the client device 510 is in possession of a private key of a previously established key pair (e.g., a key pair established when the entity A registered the client device 510 with the data management service 110A). Additionally, or alternatively, the client device 510 and the data management service 110A may engage in an authentication protocol based on one or more factors, such as a password, a fingerprint, a physical unclonable function (PUF), etc.

In some embodiments, the data management service 110A may demonstrate to the client device 510 that the data management service 110A is in possession of a private key associated with a distributed ledger address of the entity A (e.g., by publishing one or more transactions). Additionally, or alternatively, the data management service 110A may demonstrate to the client device 510 that the data management service 110A is in possession of a private key that corresponds to a public key included in a certificate signed by a certificate authority.

In some embodiments, the client device 510 and the data management service 110A may, upon successful authentication, establish a secure communication channel. For instance, messages transmitted via this channel may be encrypted and/or signed by respective senders. In some embodiments, a Transport Layer Security (TLS) protocol may be used to provide confidentiality (e.g., by establishing a shared key for symmetric encryption), integrity (e.g., via message authentication codes), and/or one or more other security properties.

In some embodiments, the client device 510 and the data management service 110A may use the secure channel to transmit one or more keys. For instance, the data management service 110A may send, to the client device 510, a public key of a key pair associated with the secure hardware 505. Additionally, or alternatively, the data management service 110A may send, to the client device 510, an identifier that may be used by the client device 510 to look up the public key of the secure hardware 505 from a suitable public key infrastructure (PKI). In some embodiments, the PKI may be provided via a distributed ledger, and the identifier may be a distributed ledger address associated with the secure hardware 505.

At act 525, the client device 510 may encrypt one or more attribute values to be sent to the data management service 110A. In some embodiments, the client device 510 may select the one or more attribute values based on a request from a counterparty (e.g., as described herein in connection with the example of FIG. 4). Additionally, or alternatively, the client device 510 may select the one or more attribute values based on input from the entity A.

The one or more attribute values may be encrypted in any suitable manner. For instance, the one or more attribute values may be encrypted using a hybrid encryption scheme, where an asymmetric cryptosystem may be used to establish a shared secret that may then be used to encrypt the one or more attribute values using a symmetric cryptosystem. Examples of asymmetric cryptosystems include, but are not limited to, cryptosystems based on discrete logarithm (e.g., ElGamal), cryptosystems based on decisional composite residuosity (e.g., Paillier), cryptosystems based on factorization (e.g., RSA), etc. Examples of symmetric cryptosystems include, but are not limited to, Advanced Encryption Standard (AES), Triple Data Encryption Standard (3DES), etc. However, it should be appreciated that aspects of the present disclosure are not limited to using any particular asymmetric or symmetric cryptosystem.

In some embodiments, an integrated encryption scheme, such as a discrete log integrated encryption scheme (DL-IES) or an elliptic curve integrated encryption scheme (EC-IES), may be used. The integrated encryption scheme may use an asymmetric key agreement protocol to establish a symmetric key for use in encrypting a message. For instance, the client device 510 may generate a fresh private random value and a corresponding public random value. The client device 510 may combine the private random value with the public key of the secure hardware 505 to obtain a shared secret in such a way that the same shared secret may be recovered by combining the public random value with the private key of the secure hardware 505. The client device 510 may use the shared secret to generate a symmetric key, which may in turn be used to encrypt the one or more attribute values.

In some embodiments, a key agreement protocol may be based on a group of integers modulo prime number p, where the private random value may be a value x that is randomly selected (e.g., using a true random number generator and/or a pseudo-random number generator), and the public random value may be $g^x$, where g is a generator of the group (written multiplicatively). The private key of the secure hardware 505 may be a value y that is randomly selected (e.g., using a true random number generator and/or a pseudo-random number generator), and the public key of the secure hardware 505 may be $g^y$. The shared secret may be $(g^x)^y=(g^y)^x$.

In some embodiments, a key agreement protocol may be based on a group of points on an elliptic curve, where the private random value may be a value x that is randomly selected (e.g., using a true random number generator and/or a pseudo-random number generator), and the public random value may be xG, where G is a generator of the group (written additively). The private key of the secure hardware 505 may be a value y that is randomly selected (e.g., using a true random number generator and/or a pseudo-random number generator), and the public key of the secure hardware 505 may be yG. The shared secret may be y(xG)=x(yG).

At act 530, the client device 510 may send the one or more attribute values and/or one or more associated public random values to the data management service 110A. In some embodiments, the one or more attribute values and/or the one or more associated public random values may be signed using the private key associated with the distributed ledger address of the entity A and/or the private key of the previously established key pair for the client device 510. One or more resulting signatures may also be sent to the data management service 110A.

At act 535, the data management service 110A may store the one or more attribute values and/or the one or more associated public random values. In some embodiments, the one or more attribute values may be sent in encrypted form, and the data management service 110A may not decrypt, so that the one or more attribute values may be stored in encrypted form.

Additionally, or alternatively, the data management service 110A may authenticate the one or more attribute values and/or the one or more associated public random values, for example, by checking the one or more signatures using the public key associated with the distributed ledger address of the entity A and/or the public key of the previously established key pair for the client device 510.

At act 540, the client device 510 may send, to the data management service 110A, a request to share the one or more attribute values with another entity. As one example, the entity A may wish to have the one or more attribute values verified and/or attested to by a trusted party (e.g., as described herein in connection with the example of FIG. 3A). As another example, the entity A may wish to obtain a service from a counterparty, and the counterparty may request the one or more attribute values (e.g., as described herein in connection with the example of FIG. 4).

At act 545, the data management service 110A may, in response to the request received at act 540, confirm whether the entity A and the other entity are in a trust relationship. For instance, the entity A may publish a data structure to a distributed ledger, to indicate that the entity A wishes to share selected data with the other entity. In some embodiments, the data structure may include a badge storing one or more attestations, which may correspond, respectively, to the one or more attribute values to be shared. The badge may include an indication that the other entity is designated as a trusted party responsible for verifying and/or attesting to the one or more attribute values, or is a counterparty with whom the entity A wishes to share the one or more attribute values. The data management service 110A may access the badge from the distributed ledger, and may use information in the badge to confirm that the entity A and the other entity are indeed in a trust relationship.

If the data management service 110A confirms, at act 545, that the entity A and the other entity are in a trust relationship, the data management service 110A may proceed to act 550, and authorize sharing of the one or more attribute values with the other entity. For instance, the data management service 110A may cause the secure hardware 505 to retrieve, from storage, the one or more attribute values and/or the one or more associated public random values, which may still be encrypted.

At act 555, the secure hardware 505 may decrypt the one or more attribute values. For instance, the secure hardware 505 may use the one or more associated public random values and the private key of the secure hardware 505 to recover the shared secret. The secure hardware may then use the shared secret to generate a symmetric key for use in decrypting the one or more attribute values.

At act 560, the secure hardware 505 may re-encrypt the one or more attribute values. For instance, the secure hardware 505 may use the same integrated encryption scheme used by the client device 510, but with one or more freshly generated pairs of public and private random values. However, it should be appreciated that any suitable encryption scheme may be used additionally or alternatively.

In some embodiments, the secure hardware 505 may re-encrypt the one or more attribute values using one or more keys associated with the other entity. For instance, the secure hardware 505 may use, in the integrated encryption scheme, a public key associated with a distributed ledger address of the other entity. Thus, this public key may correspond to a private key used by the other entity to sign distributed ledger transactions. However, it should be appreciated that aspects of the present disclosure are not limited to using a distributed ledger to provide a PKI, as any suitable PKI may be used.

Additionally, or alternatively, the secure hardware 505 may sign the one or more attribute values using one or more keys associated with the entity A (e.g., the private key of the entity A's distributed ledger address, which is used by the entity A to sign distributed ledger transactions).

Once re-encrypted and/or signed, the one or more attribute values may be sent to the other entity (e.g., as described in the example of FIG. 3A or the example of FIG. 4).

Although some details of implementation are described above in connection with FIG. 5, it should be appreciated that such details are provided solely for purposes of illustration. Aspects of the present disclosure are not limited to any particular manner of implementation. For instance, the secure hardware 505 may maintain multiple key pairs, where each key pair may correspond to a respective entity and/or a respective device. The public key used at act 525 may thus be a public key maintained by the secure hardware for the entity A and/or the client device 510.

In some embodiments, a process similar to the illustrative process 515 may be performed between a device of the illustrative entity B and the illustrative data management service 110B when the entity B issues an attribute value (e.g., as described above in connection with act 360 in the example of FIG. 3B).

In some embodiments, a data management system may be used to provide a custodial key service for managing cryptographic keys of digital assets. Examples of digital assets include, but are not limited to, crypto currencies and tokens. Such digital assets may be accessed using corresponding cryptographic keys (e.g., a private key in a key pair for an asymmetric cryptosystem).

The inventors have recognized and appreciated that it may be desirable to safeguard cryptographic keys of digital assets, as a cryptographic key may correspond to a digital asset having an arbitrarily high value. Analogous to losing a banknote, there may be no recovery possible if the cryptographic key is lost (e.g., due to hardware memory failure). Moreover, if the cryptographic key is compromised by a hacker, the hacker may transfer the corresponding digital asset to one or more other cryptographic keys controlled by the hacker. In a fully distributed system, there may be no recourse for such an unauthorized transfer.

In some digital asset systems, owners of digital assets may be tasked with managing cryptographic keys. A technology-savvy owner may use hardware and/or software wallets to store cryptographic keys. Such mechanisms may offer varying degrees of security, and may be too complex for adoption by the broader public.

In some instances, a centralized exchange may be used for storing cryptographic keys and transferring digital assets therebetween. While such an exchange may improve user experience, there may be less desirable aspects. For instance, users of a centralized exchange may rely on an operator of the exchange being trustworthy. Moreover, even if the exchange operator is trustworthy, the exchange may be susceptible to hacking. In a worst case scenario, a hacker may hack into the exchange, and steal all digital assets handled by the exchange.

Some exchanges may attempt to mitigate risk by pooling digital assets. For instance, digital assets of users A and B may be pooled, so that a digital asset of the user A may be used to make a payment on behalf of the user B, and vice versa, with appropriate accounting administered by the exchange. In this manner, only a small number of cryptographic keys may be made accessible at one time, while other cryptographic keys may be kept in a storage device that is not connected to any network (e.g., a storage device in a safe deposit box).

The inventors have recognized and appreciated that, although keeping some cryptographic keys offline may reduce a risk of all cryptographic keys being compromised, the offline cryptographic keys may, by design, have limited availability. Therefore, such a solution may not be suitable in use cases where ready access to certain keys may be desirable (e.g., keys that correspond to respective identities and are used to sign transactions).

Accordingly, in some embodiments, improved techniques for managing cryptographic keys of digital assets may be provided. For instance, a custodial key service may be provided, which may store a cryptographic key of a digital asset for an owner of the digital asset. If the asset owner wishes to transfer the digital asset to an asset recipient, the asset owner may submit a transfer request to the custodial key service.

In some embodiments, upon receiving a transfer request concerning a digital asset, the custodial key service may check an identity of an entity from which the transfer request is received to confirm that the entity is indeed an owner of the digital asset. Additionally, or alternatively, the custodial key service may check an identity of an asset recipient indicated in the transfer request. Once the transfer request is checked, the custodial key service may use the cryptographic key of the digital asset to sign the transfer request. In this manner, the asset owner may authorize the transfer without directly handling the cryptographic key.

In some embodiments, a digital asset may be associated with multiple cryptographic keys. For instance, a digital asset may be associated with M different keys, where at least N of the M keys (N≤M) may be needed to access the digital asset. Accordingly, in some embodiments, multiple custodial key services may be provided, each storing one of the M cryptographic keys of the digital asset. As one example, there may be M custodial key services. As another example, there may be M−1 custodial key services, while an owner of the digital asset may hold one of the M keys. If the threshold N is set to be M (i.e., N=M), authorization by the owner, as well as all of the M−1 custodial key services, may be needed to effectuate a transfer.

In some embodiments, if an asset owner wishes to transfer a digital asset to an asset recipient, the asset owner may submit a transfer request to at least N custodial key services. Upon receiving a transfer request, each custodial key service may check an identity of an entity from which the transfer request is received to confirm that the entity is indeed the asset owner. Additionally, or alternatively, each custodial key service may check an identity of the asset recipient. Once the transfer request is checked, the custodial key service may use the corresponding cryptographic key of the digital asset to sign the transfer request.

In this manner, a hacker may be unable to perform an unauthorized transfer unless the hacker successfully compromises at least N custodial key services, resulting in improved security of the digital asset. Also, by selected a threshold N that is strictly less than M, redundancy may be provided, so that N signatures may be possible even if one or more custodial key services become unavailable (e.g., due to network failure). However, it should be appreciated that aspects of the present disclosure are not limited to having multiple custodial key services, nor to having any particular threshold. In some embodiments, there may be just one custodial key service. Additionally, or alternatively, the threshold N may be set to 1, so that only one custodial key service may be used.

The inventors have further recognized and appreciated that a custodial key service may be used to enforce one or more transfer restrictions associated with a digital asset. For instance, in addition to, or instead of, checking an identity of an asset owner and/or an identity of an asset recipient, a custodial key service may check a blacklist and/or a whitelist to confirm that the proposed transfer should be allowed to proceed. For example, the blacklist (or the whitelist) may indicate owners, recipients, and/or specific assets for which transfers are prohibited (or allowed). Additionally, or alternatively, the custodial key service may perform one or more checks according to one or more government and/or other regulations to confirm that the proposed transfer is in compliance. Examples of regulations include, but are not limited to, anti-money-laundering (AML) regulations.

Figure 6:
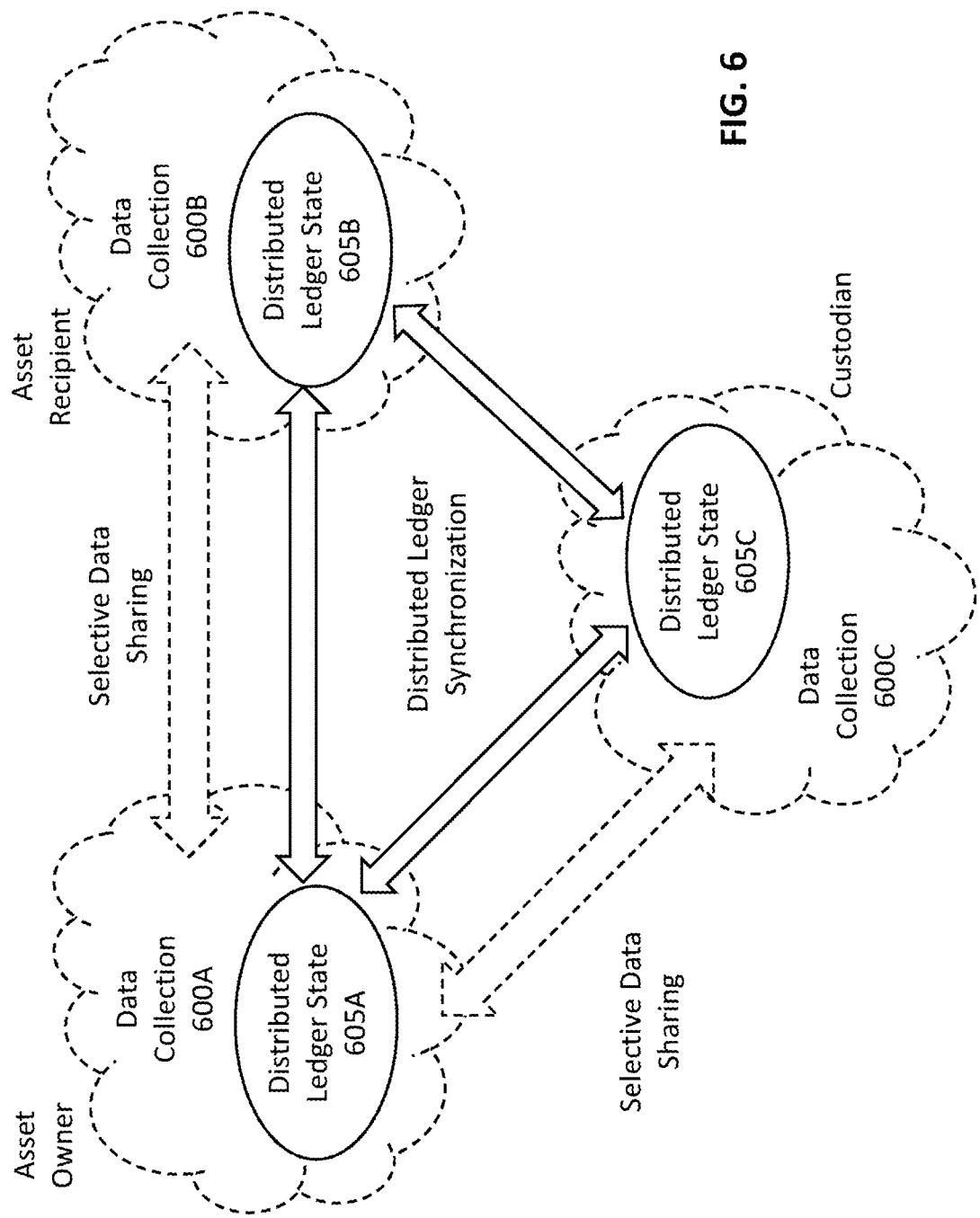
FIG. 6 shows illustrative data collections 600A-C, in accordance with some embodiments.

FIG. 6 shows illustrative data collections 600A-C, in accordance with some embodiments. The data collection 600A may be associated with an asset owner, which may be an entity currently holding one or more digital assets to be transferred. The data collection 600B may be associated with an asset recipient, which may be an entity to which the one or more digital assets are to be transferred. The data collection 600C may be associated with a custodian, which may be an entity that provides a custodial key service.

In some embodiments, the asset owner, the asset recipient, and/or the custodian may be associated with one or more nodes in a network of nodes that collectively maintain a distributed ledger. For instance, the data collections 600A-C may include, respectively, distributed ledger states 605A-C, and the one or more associated network nodes may participate in a protocol to synchronize the distributed ledger states 605A-C. In this manner, the entities may publish non-sensitive data (e.g., hashes of sensitive data) to the distributed ledger by storing the non-sensitive data as part of the respective distributed ledger states.

It should be appreciated that aspects of the present disclosure are not limited to maintaining a distributed ledger state in any particular manner, or at all. For instance, in some embodiments, the asset owner, the asset recipient, and/or the custodian may access a distributed ledger via an associated network node, without maintaining a distributed ledger state. Additionally, or alternatively, a distributed ledger state may include state information of multiple distributed ledgers that are linked in a suitable manner (e.g., using a suitable cross-ledger referencing scheme).

Although not shown in FIG. 6, the data collections 600A-C may, in some embodiments, be managed by respective data management services similar to the illustrative data management services 110A-B in the example of FIG. 1B. Additionally, or alternatively, the distributed ledger states 605A-C may be managed by respective distributed ledger clients (not shown in FIG. 6) similar to the illustrative distributed ledger clients 115A-B in the example of FIG. 1B.

In some embodiments, the asset owner and the asset recipient may engage in a transaction via respective applications (not shown in FIG. 6). The applications may invoke, respectively, application programming interfaces provided by data management services of the asset owner and the asset recipient. The data management services may in turn communicate with each other via a secure channel (e.g., with end-to-end encryption) to effectuate selective data sharing between the data collections 600A-B.

In some embodiments, the asset owner's data management service may communicate with the custodian's data management service via a secure channel (e.g., with end-to-end encryption) to effectuate selective data sharing between the data collections 600A and 600C. For instance, the asset owner's data management service may initiate a request to transfer one or more digital assets to the asset recipient. Upon receiving such a request, the custodian's data management service may perform one or more checks, such as checking an identity of the asset owner, checking an identity of the asset recipient, and/or verifying compliance with one or more digital asset transfer restrictions. If the one or more checks are successful, the custodian's data management service may use one or more cryptographic keys associated with the one or more digital assets to authorize the proposed transfer.

In some embodiments, the custodian's data management service may not directly interact with the asset recipient's data management service. Instead, the custodian's data management service may check an identity of the asset recipient based on information received from the asset owner's data management service.

Although only one custodian is shown in FIG. 6, it should be appreciated that aspects of the present disclosure are not so limited. In some embodiments, there may be M custodians, N of which may be asked to authorize transfer of the one or more digital assets. It should also be appreciated that any suitable entity may provide a custodial key service, and that a custodial key service may be implemented in any suitable manner using one or more computers. For instance, in some embodiments, a custodial key service may include program logic for automatically enforcing one or more digital asset transfer restrictions. Such a transfer restriction may be hardcoded into the program logic itself. Additionally, or alternatively, the program logic, when executed, may access an applicable transfer restriction from a suitable source (e.g., by searching one or more databases of transfer restrictions using one or more characteristics of a proposed transfer).

Figure 7:
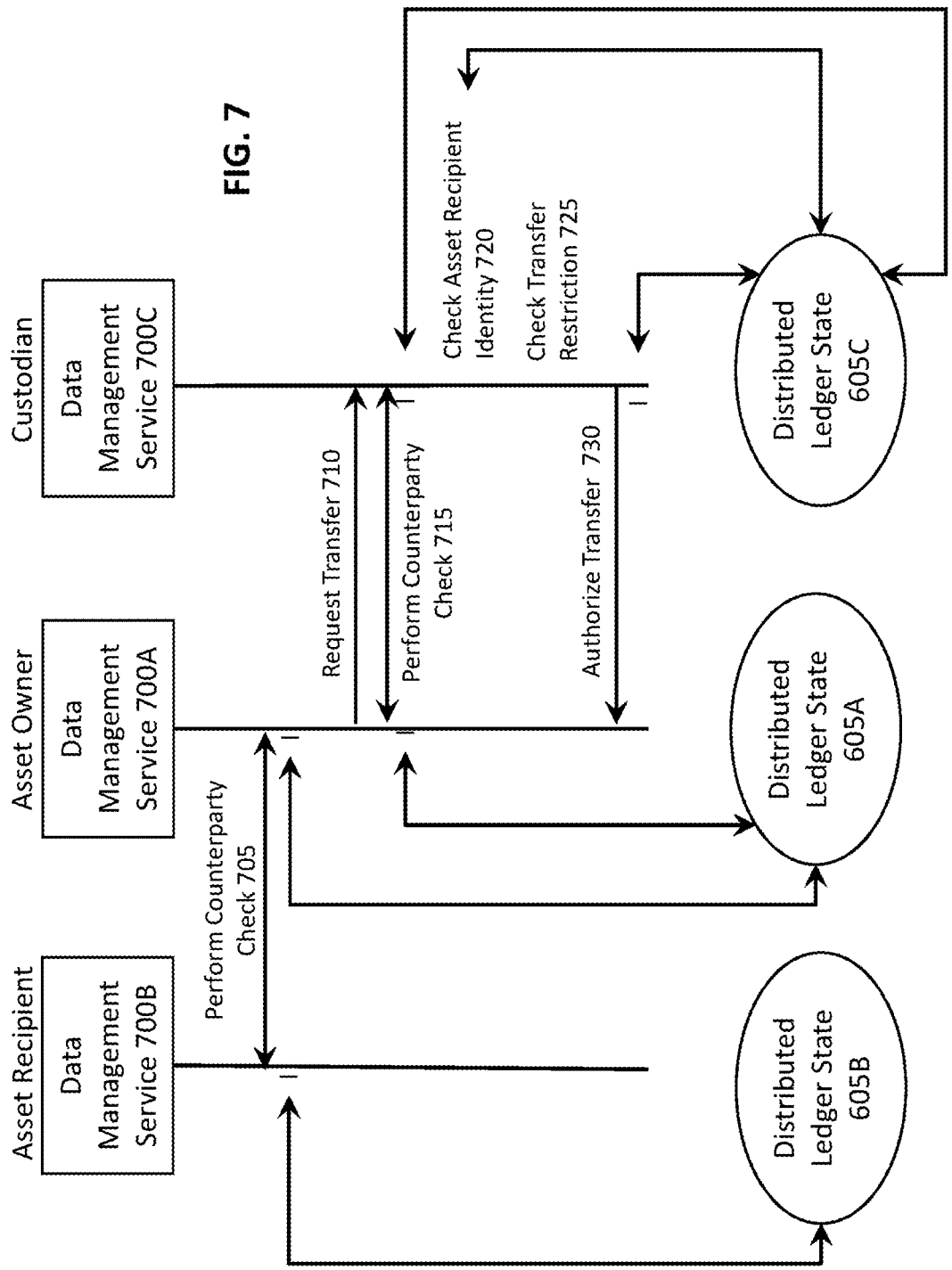
FIG. 7 shows illustrative data management services 700A-C, in accordance with some embodiments.

FIG. 7 shows illustrative data management services 700A-C, in accordance with some embodiments. The data management services 700A-C may be associated with an asset owner, an asset recipient, and a custodian, respectively. For instance, the data management services 700A-C may manage, respectively, the illustrative data collections 600A-C in the example of FIG. 6. Each of the data management services 700A-C may be implemented in any suitable manner, for instance, as described in the '643 application, and/or as described herein.

In some embodiments, the data management services 700A-C may participate in a process for transferring one or more digital assets from the asset owner to the asset recipient, for instance, as described in connection with FIG. 6. An example of such a process is shown in FIG. 7.

At act 705, the asset owner's data management service 700A may initiate a counterparty check to check one or more attribute attestations of the asset recipient. Additionally, or alternatively, the asset recipient's data management service 700B may initiate a counterparty check to check one or more attribute attestations of the asset owner.

The asset owner's data management service 700A may check any suitable set of one or more attribute attestations of the asset recipient. For instance, an application of the asset owner (not shown in FIG. 7) may communicate with an application of the asset recipient (not shown in FIG. 7) to request that the asset recipient provide a suitable form of identification (e.g., passport, driver's license, credit card, etc.). This may allow the asset owner to confirm that a transfer of the one or more digital assets to the asset recipient does not violate any government or other regulation (e.g., an AML regulation).

In some embodiments, the asset recipient's application may invoke an application programming interface provided by the data management service 700B, which may, in response, establish a secure communication channel (e.g., with end-to-end encryption) with the data management service 700A. The data management service 700B may use the secure communication channel to send, to the data management service 700A, one or more requested attribute values. For instance, if the requested form of identification includes a passport, the data management service 700B may send one or more items of information, such as an image of a photo page of the passport, a code (e.g., QR code, bar code, etc.) read from the passport, name, date of birth, issue date, expiry date, etc. Additionally, or alternatively, the data management service 700B may send one or more pointers to locations where the one or more items may be retrieved.

In some embodiments, the data management service 700B may send, to the data management service 700A, a distributed ledger address to which the digital asset is to be transferred. Such a distributed ledger address may be sent as an item of information in addition to, or instead of, one or more items of information from an independent form of identification (e.g., passport, driver's license, credit card, etc.).

In some embodiments, each item of information sent by the data management service 700B may be treated as a separate attribute value with a corresponding attestation. However, it should be appreciated that aspects of the present disclosure are not limited to providing attribute values at any particular granularity. In some embodiments, a set of multiple items may be treated as a single attribute value, and thus may correspond to a single attestation.

The counterparty check may then proceed in any suitable manner, for example, as described in the '643 application, and/or as described herein in connection with the example of FIG. 4. For instance, in some embodiments, the data management service 700B may send to the data management service 700A a pointer to a smart contract (e.g., a digital identity representation described in the '643 application) stored in a distributed ledger. The smart contract may be programmed to manage one or more attribute attestations, which may be organized into a badge. However, it should be appreciated that aspects of the present disclosure are not limited to using a smart contract or a badge.

In some embodiments, the data management service 700A may use a pointer received from the data management service 700B to access one or more attribute attestations from a distributed ledger (e.g., from the illustrative distributed ledger state 605A described above in connection with FIG. 6). The data management service 700A may then check one or more received attribute values (e.g., the passport photo page, the distributed ledger address, etc.) against one or more respective attestations accessed from the distributed ledger.

In some embodiments, the data management service 700B may send, to the data management service 700A, a proof that the asset recipient controls the smart contract that manages the one or more attribute attestations. For instance, in some embodiments, a proof may include a message signed using a private key that controls the smart contract. Such a signature may be verified by looking up, from the distributed ledger, a public key associated with the smart contract, and using the public key to check the signature.

In some embodiments, the data management service 700B may perform a counterparty check that is similar to a counterparty check performed by the data management service 700A. This may allow the asset recipient to confirm that a transfer of the one or more digital assets from the asset owner does not violate any government or other regulation (e.g., an AML regulation). However, it should be appreciated that aspects of the present disclosure are not limited to performing a counterparty check in any particular manner, or to performing any counterparty check at all.

Returning to FIG. 7, if the counterparty check performed by the data management service 700A is successful, the data management service 700A may, at act 710, submit a transfer request to one or more custodians. For instance, the data management service 700A may establish a secure communication channel (e.g., with end-to-end encryption) with the data management service 700C, and may use the secure channel to send a transfer request to the data management service 700C.

In some embodiments, the transfer request may indicate a distributed ledger address where the one or more digital assets to be transferred are currently held (e.g., a FROM account), one or more respective amounts of the one or more digital assets to be transferred, and/or a distributed ledger address to which the one or more digital assets are to be transferred (e.g., a TO account).

Additionally, or alternatively, the transfer request may include information about the asset recipient. For instance, in some embodiments, the transfer request may include a pointer to one or more attribute attestations of the asset recipient, a pointer to a smart contract that manages the one or more attribute attestations, one or more attribute values of the asset recipient, and/or one or more pointers to locations where the one or more attribute values may be fetched. The one or more attribute values may correspond, respectively, to the one or more attribute attestations.

In some embodiments, the information about the asset recipient may be received by the data management service 700A from the data management service 700B at act 705, and may be forwarded by the data management service 700A to the data management service 700C at act 710. As discussed below in connection with act 720, this information may allow the data management service 700C to check the asset recipient's identity without communicating directly with the data management service 700B.

At act 715, the custodian's data management service 700C may initiate a counterparty check to check one or more attribute attestations of the asset owner. This counterparty check may be performed in any suitable manner, for example, as described in the '643 application, and/or as described herein in connection with FIG. 4 and/or act 705 of FIG. 7. For instance, the data management service 700A may send, to the data management service 700C, a pointer to one or more attribute attestations of the asset owner, a pointer to a smart contract that manages the one or more attribute attestations, one or more attribute values of the asset owner, and/or one or more pointers to locations where the one or more attribute values may be fetched. The one or more attribute values may correspond, respectively, to the one or more attribute attestations.

Additionally, or alternatively, the asset owner's data management service 700A may initiate a counterparty check to check one or more attribute attestations of the custodian. This counterparty check may be performed in any suitable manner, for example, as described in the '643 application, and/or as described herein in connection with FIG. 4 and/or act 705 of FIG. 7. For instance, the data management service 700C may send, to the data management service 700A, a pointer to one or more attribute attestations of the custodian, a pointer to a smart contract that manages the one or more attribute attestations, one or more attribute values of the custodian, and/or one or more pointers to locations where the one or more attribute values may be fetched. The one or more attribute values may correspond, respectively, to the one or more attribute attestations.

It should be appreciated that aspects of the present disclosure are not limited to performing act 715 in response to the transfer request of act 710. In some embodiments, the asset owner's data management service 700A may, prior to requesting a transfer, register the one or more digital assets with the custodian's data management service 700C. As part of a registration process, the custodian's data management service 700C may check one or more attribute attestations of the asset owner. Additionally, or alternatively, the asset owner's data management service 700A may check one or more attribute attestations of the custodian.

At act 720, the data management service 700C may check the asset recipient's identity. In some embodiments, this may be done without interacting directly with the data management service 700B. For instance, the data management service 700C may use a pointer received from the data management service 700A to access one or more attribute attestations of the asset recipient from a distributed ledger (e.g., from the illustrative distributed ledger state 605C described above in connection with FIG. 6). The data management service 700C may then check one or more attribute values forwarded by the data management service 700A against the one or more attestations accessed from the distributed ledger.

However, it should be appreciated that aspects of the present disclosure are not limited to having the asset owner send information about the asset recipient to the custodian. In some embodiments, the custodian may interact with the asset recipient in addition to, or instead of, the asset owner.

The inventors have recognized and appreciated that an asset owner may attempt to evade a transfer restriction (e.g., an AML regulation) by indicating in the transfer request a distributed ledger address of an entity that is subject to the transfer restriction, but sending information (e.g., one or more attribute attestations) of an entity that is not subject to the transfer restriction. Accordingly, in some embodiments, the data management service 700C may check that a distributed ledger address to which the one or more digital assets are to be transferred (e.g., a TO account indicated in the transfer request received at act 710) indeed belongs to an entity associated with the one or more attribute attestations accessed from the distributed ledger. Additionally, or alternatively, the one or more attribute attestations may be stored in a smart contract (and/or organized into a badge), and the data management service 700C may check that the distributed ledger address to which the one or more digital assets are to be transferred indeed belongs to an entity associated with the smart contract (and/or the badge).

For instance, in some embodiments, the data management service 700C may check that the one or more attribute attestations include an attestation for a distributed ledger address attribute, and that the corresponding attribute value matches the distributed ledger address to which the one or more digital assets are to be transferred.

At act 725, the data management service 700C may check one or more transfer restrictions. In some embodiments, the data management service 700C may check a blacklist and/or a whitelist to confirm that the proposed transfer should be allowed to proceed. For example, the blacklist (or the whitelist) may indicate owners, recipients, and/or specific assets for which transfers are prohibited (or allowed). Additionally, or alternatively, the data management service 700C may perform one or more checks according to one or more government and/or other regulations (e.g., AML regulations) to confirm that the proposed transfer is in compliance.

In some embodiments, the data management service 700C may enforce a transfer restriction based on one or more attribute values of the asset owner and/or the asset recipient. For example, the data management service 700C may have, at act 715 or act 720, checked such an attribute value against an attribute attestation accessed from the distributed ledger. In some embodiments, this may be done by applying, to a received salt and a received attribute value, a cryptographic hash function indicated in a smart contract from which the attribute attestation is accessed. A resulting salted hash may then be compared against a cryptographic proof found in the attribute attestation. However, it should be appreciated that aspects of the present disclosure are not limited to generating or checking a cryptographic proof in any particular manner.

In some embodiments, having checked the attribute value, the data management service 700C may apply one or more transfer restriction rules to the attribute value. As one example, the attribute value may be the asset recipient's country of residence or legal name, and the custodial key service may apply one or more transfer restriction rules regarding sanctioned countries or individuals.

In some embodiments, if all of the one or more checks performed by the data management service 700C are successful, the data management service 700C may, at act 730, allow the proposed transfer to proceed. For example, the data management service 700C may sign a data structure storing information regarding the proposed transfer, and may return the signed data structure to the data management service 700A. The data structure may be in a format suitable for processing by a distributed ledger that is managing the one or more digital assets to be transferred, and the data management service 700C may sign the data structure using a cryptographic key that controls the one or more digital assets (e.g., one of M such keys). The data management service 700A may cause the signed data structure to be published to the distributed ledger, thereby effectuating the proposed transfer.

Additionally, or alternatively, the one or more digital assets may be associated with program logic (e.g., a smart contract) that allows the data management service 700C to effectuate the proposed transfer directly in the distributed ledger, for example, by using the cryptographic key that controls the one or more digital assets to sign one or more appropriate messages.

In some embodiments, M custodians may be available. The one or more digital assets may remain with the asset owner, or may be held in escrow, until at least N custodians (N≤ M) have approved the proposed transfer. For instance, a distributed ledger with a multi-signature scheme may be used, where each digital asset may be associated with M cryptographic keys. Each of the M custodians may have a corresponding key, and a transfer of the digital asset may require at least N custodians to sign with their respective keys. However, it should be appreciated that any suitable number of custodians may be used, including just one custodian, or no custodian at all. When there are multiple custodians, such custodians may operate independently of one another.

In some embodiments, program logic (e.g., a smart contract) associated with a digital asset may check that at least a threshold number of custodians have signed. Additionally, or alternatively, the program logic may enforce one or more applicable transfer restrictions. For instance, the program logic may enforce a transfer restriction based on one or more attribute values of the asset owner and/or the asset recipient. The program logic may check such an attribute value against an attribute attestation stored in a distributed ledger (e.g., in an appropriate smart contract), and may release the digital asset only if none of the one or more applicable transfer restrictions is violated. In this manner, enforcement of transfer restrictions may take place inside a trust layer.

Figure 8:
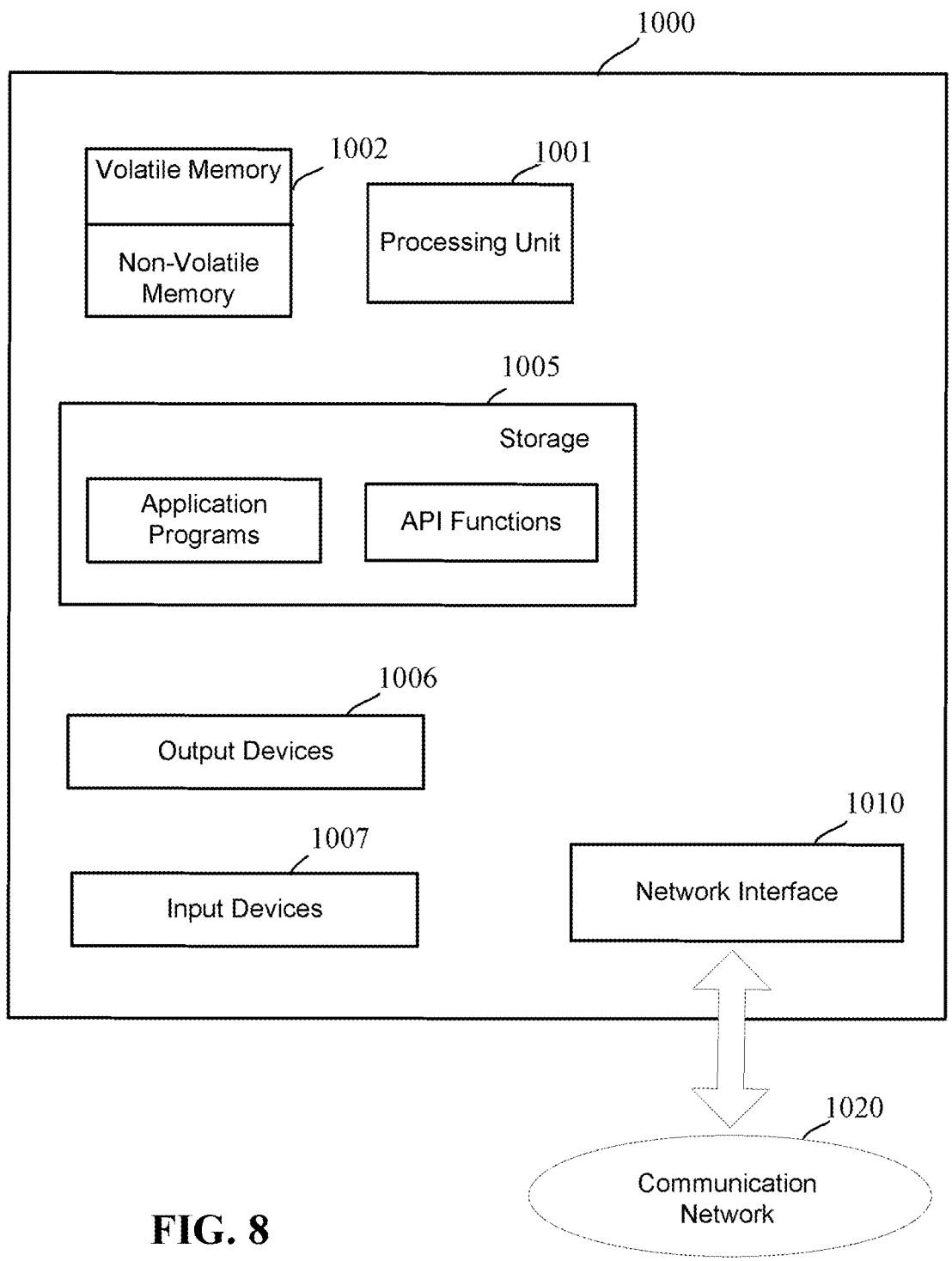
FIG. 8 shows, schematically, an illustrative computer 1000 on which any aspect of the present disclosure may be implemented.

FIG. 8 shows, schematically, an illustrative computer 1000 on which any aspect of the present disclosure may be implemented. In the embodiment shown in FIG. 8, the computer 1000 includes a processing unit 1001 having one or more computer hardware processors and one or more articles of manufacture that comprise non-transitory computer-readable storage media (e.g., system memory 1002) that may include, for example, volatile and/or non-volatile memory. The memory 1002 may store one or more instructions to program the processing unit 1001 to perform any of the functions described herein. The computer 1000 may also include other types of non-transitory computer-readable media, such as storage 1005 (e.g., one or more disk drives) in addition to the system memory 1002. The storage 1005 may also store one or more application programs and/or external components used by application programs (e.g., software libraries), which may be loaded into the memory 1002. To perform any of the functionality described herein, processing unit 1001 may execute one or more processor-executable instructions stored in the one or more non-transitory computer-readable storage media (e.g., memory 1002, storage 1005), which may serve as non-transitory computer-readable storage media storing processor-executable instructions for execution by the processing unit 1001.

The computer 1000 may have one or more input devices and/or output devices, such as devices 1006 and 1007 illustrated in FIG. 8. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards and pointing devices, such as mice, touch pads, and digitizing tablets. As another example, the input devices 1007 may include a microphone for capturing audio signals, and the output devices 1006 may include a display screen for visually rendering, and/or a speaker for audibly rendering, recognized text.

As shown in FIG. 8, the computer 1000 may also comprise one or more network interfaces (e.g., the network interface 10010) to enable communication via various networks (e.g., the network 10020). Examples of networks include a local area network or a wide area network, such as an enterprise network or the Internet. Such networks may be based on any suitable technology and may operate according to any suitable protocol and may include wireless networks, wired networks or fiber optic networks.

Having thus described several aspects of at least one embodiment, it is to be appreciated that various alterations, modifications, and improvements will readily occur to those skilled in the art. Such alterations, modifications, and improvements are intended to be within the spirit and scope of the present disclosure. Accordingly, the foregoing description and drawings are by way of example only.

The above-described embodiments of the present disclosure can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the concepts disclosed herein may be embodied as a non-transitory computer-readable medium (or multiple computer-readable media) (e.g., a computer memory, one or more floppy discs, compact discs, optical discs, magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the present disclosure discussed above. The computer-readable medium or media can be transportable, such that the program or programs stored thereon can be loaded onto one or more different computers or other processors to implement various aspects of the present disclosure as discussed above.

The terms "program" or "software" are used herein to refer to any type of computer code or set of computer-executable instructions that can be employed to program a computer or other processor to implement various aspects of the present disclosure as discussed above. Additionally, it should be appreciated that according to one aspect of this embodiment, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through use of pointers, tags or other mechanisms that establish relationship between data elements.

Various features and aspects of the present disclosure may be used alone, in any combination of two or more, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the concepts disclosed herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc. in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. Use of "including," "comprising," "having," "containing," "involving," and variations thereof herein, is meant to encompass the items listed thereafter and equivalents thereof as well as additional items.

The invention claimed is:

1. A system comprising:
at least one computer processor; and
at least one computer-readable medium having encoded thereon instructions which, when executed, cause the at least one computer processor to perform a method comprising acts of:
receiving, from a first entity, one or more attribute values of a second entity different from the first entity;
obtaining one or more attribute attestations, wherein the one or more attribute attestations correspond, respectively, to the one or more attribute values of the second entity;
checking the one or more attribute values received from the first entity against the one or more attribute attestations;
using at least one attribute value of the one or more attribute values to check one or more transfer rules; and
in response to establishing compliance with the one or more transfer rules, authorizing a transfer of one or more digital assets, wherein:
the first entity is associated with a first cryptographic key of an N-out-of-M threshold cryptographic scheme,
authorizing the transfer of one or more digital assets comprises using one or more second cryptographic keys of the N-out-of-M threshold cryptographic scheme to sign a data structure storing information regarding the transfer, the one or more second cryptographic keys being different from the first cryptographic key,
each of the one or more second cryptographic keys is associated with a respective key service, and
the transfer is further authorized using the first cryptographic key associated with the first entity.

2. The system of claim 1, wherein:
a request is received from the first entity to transfer the one or more digital assets; and
the one or more attribute values of the second entity and the one or more attribute attestations are obtained based on the request to transfer the one or more digital assets.

3. The system of claim 1, wherein:
a request is received from the first entity to transfer the one or more digital assets;
the request indicates that the one or more digital assets are to be transferred to a distributed ledger address;
authorizing the transfer of the one or more digital assets comprises authorizing the transfer of the one or more digital assets to the distributed ledger address; and
the method further comprises an act of determining whether the distributed ledger address to which the one or more digital assets are to be transferred matches an attribute value of the one or more attribute values received from the first entity.

4. The system of claim 1, wherein:
the one or more attribute values comprise a name and a physical address of the second entity.

5. The system of claim 1, wherein:
the one or more transfer rules comprise a reporting rule and/or a transfer restriction rule regarding one or more sanctioned jurisdictions and/or individuals.

6. The system of claim 1, wherein:
obtaining one or more attribute attestations comprises using a pointer to access the one or more attribute attestations from a distributed ledger; and
the pointer is received from the first entity.

7. The system of claim 1, wherein the method further comprises an act of:
using one or more characteristics of the transfer to search one or more databases for one or more applicable transfer rules.

8. A computer-implemented method, comprising acts of:
receiving, from a first entity, one or more attribute values of a second entity different from the first entity;
obtaining one or more attribute attestations, wherein the one or more attribute attestations correspond, respectively, to the one or more attribute values of the second entity;
checking, using at least one computer processor, the one or more attribute values received from the first entity against the one or more attribute attestations;
using at least one attribute value of the one or more attribute values to check one or more transfer rules; and
in response to establishing compliance with the one or more transfer rules, authorizing a transfer of one or more digital assets, wherein:
the first entity is associated with a first cryptographic key of an N-out-of-M threshold cryptography scheme,
authorizing the transfer of one or more digital assets comprises using one or more second cryptographic keys of the N-out-of-M threshold cryptography scheme to sign a data structure storing information regarding the transfer, the one or more second cryptographic keys being different from the first cryptographic key,
each of the one or more second cryptographic keys is associated with a respective key service, and
the transfer is further authorized using the first cryptographic key associated with the first entity.

9. The method of claim 8, wherein:
a request is received from the first entity to transfer the one or more digital assets; and
the one or more attribute values of the second entity and the one or more attribute attestations are obtained based on the request to transfer the one or more digital assets.

10. The method of claim 8, wherein:
a request is received from the first entity to transfer the one or more digital assets; and
the request indicates that the one or more digital assets are to be transferred to a distributed ledger address;
authorizing the transfer of the one or more digital assets comprises authorizing the transfer of the one or more digital assets to the distributed ledger address; and
the method further comprises an act of determining whether the distributed ledger address to which the one or more digital assets are to be transferred matches an attribute value of the one or more attribute values received from the first entity.

11. The method of claim 8, wherein the one or more attribute values comprise a name and a physical address of the second entity.

12. The method of claim 8, wherein the one or more transfer rules comprise a transfer rule selected from the group consisting of: a reporting rule, a transfer restriction rule regarding one or more sanctioned jurisdictions, and a transfer restriction rule regarding one or more sanctioned individuals.

13. The method of claim 8, further comprising an act of:
using one or more characteristics of the transfer to search one or more databases for one or more applicable transfer rules.

14. A non-transitory computer-readable medium having encoded thereon instructions which, when executed, cause at least one computer processor to perform a method comprising acts of:
receiving, from a first entity, one or more attribute values of a second entity different from the first entity;
obtaining one or more attribute attestations, wherein the one or more attribute attestations correspond, respectively, to the one or more attribute values of the second entity;
checking the one or more attribute values received from the first entity against the one or more attribute attestations;
using at least one attribute value of the one or more attribute values to check one or more transfer rules; and
in response to establishing compliance with the one or more transfer rules, authorizing a transfer of one or more digital assets, wherein:
the first entity is associated with a first cryptographic key of an N-out-of-M threshold cryptography scheme,
authorizing the transfer of one or more digital assets comprises using one or more second cryptographic keys of the N-out-of-M threshold cryptography scheme to sign a data structure storing information regarding the transfer, the one or more second cryptographic keys being different from the first cryptographic key,
each of the one or more second cryptographic keys is associated with a respective key service, and
the transfer is further authorized using the first cryptographic key associated with the first entity.

15. The non-transitory computer-readable medium of claim 14, wherein:
a request is received from the first entity to transfer the one or more digital assets; and
the one or more attribute values of the second entity and the one or more attribute attestations are obtained based on the request to transfer the one or more digital assets.

16. The non-transitory computer-readable medium of claim 14, wherein:
a request is received from the first entity to transfer the one or more digital assets;
the request indicates that the one or more digital assets are to be transferred to a distributed ledger address;
authorizing the transfer of the one or more digital assets comprises authorizing the transfer of the one or more digital assets to the distributed ledger address, and
the method further comprises an act of determining whether the distributed ledger address to which the one or more digital assets are to be transferred matches an attribute value of the one or more attribute values received from the first entity.

17. The non-transitory computer-readable medium of claim 14, wherein the one or more attribute values comprise a name and a physical address of the second entity.

18. The non-transitory computer-readable medium of claim 14, wherein the one or more transfer rules comprise a transfer rule selected from the group consisting of: a reporting rule, a transfer restriction rule regarding one or more sanctioned jurisdictions, and a transfer restriction rule regarding one or more sanctioned individuals.

19. The non-transitory computer-readable medium of claim 14, wherein the method further comprises an act of:
using one or more characteristics of the transfer to search one or more databases for one or more applicable transfer rules.

* * * * *